United States Patent
Yang et al.

(10) Patent No.: US 11,381,358 B2
(45) Date of Patent: Jul. 5, 2022

(54) SIGNALING RELATED TO INTER-BAND CARRIER AGGREGATION

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR); Jongkeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/672,348

(22) Filed: Feb. 15, 2022

(65) Prior Publication Data
US 2022/0173877 A1    Jun. 2, 2022

Related U.S. Application Data

(63) Continuation of application No. 16/787,615, filed on Feb. 11, 2020, now Pat. No. 11,283,579.

(60) Provisional application No. 62/804,746, filed on Feb. 12, 2019.

(51) Int. Cl.
| | |
|---|---|
| *H04L 5/00* | (2006.01) |
| *H04W 24/00* | (2009.01) |
| *H04W 52/34* | (2009.01) |
| *H04W 72/04* | (2009.01) |
| *H04W 76/16* | (2018.01) |

(52) U.S. Cl.
CPC ............. *H04L 5/001* (2013.01); *H04W 24/00* (2013.01); *H04L 5/0053* (2013.01); *H04L 5/0098* (2013.01); *H04W 52/34* (2013.01); *H04W 72/0453* (2013.01); *H04W 76/16* (2018.02)

(58) Field of Classification Search
CPC ............................... H04L 5/001; H04W 24/00
See application file for complete search history.

(56) References Cited

U.S. PATENT DOCUMENTS

| | | |
|---|---|---|
| 9,479,989 B1 | 10/2016 | Mehta et al. |
| 2017/0288752 A1 | 10/2017 | Yi et al. |
| 2019/0052446 A1 | 2/2019 | Cheng et al. |
| 2019/0182898 A1 | 6/2019 | Yu et al. |

(Continued)

OTHER PUBLICATIONS

5G-NR Requirements for support of radio resource management, ETSI TS 138 133 v15.2.0 (3GPP TS 38.133 version 15.2.0 release 15), Jul. 2018.*

(Continued)

*Primary Examiner* — Kevin C. Harper
(74) *Attorney, Agent, or Firm* — Lee Hong Degerman Kang Waimey

(57) ABSTRACT

There is provided a method for performing communication related to inter-band CA. The method is performed by a wireless communication device. The wireless communication device may receive cell information from a PCell. The cell information may include first information that the PCell is collocated with a SCell within a base station or second information that the PCell is not collocated with the SCell. The PCell and the SCell are configured for the inter-band CA. The wireless communication device may perform communication with at least one of the PCell and the SCell.

13 Claims, 21 Drawing Sheets

(56) References Cited

U.S. PATENT DOCUMENTS

2020/0007292 A1   1/2020   Huang et al.
2020/0259618 A1   8/2020   Yang et al.

OTHER PUBLICATIONS

U.S. Appl. No. 16/787,615, Office Action dated Aug. 9, 2021, 12 pages.

* cited by examiner

SIGNALING RELATED TO INTER-BAND CARRIER AGGREGATION

CROSS-REFERENCE TO RELATED APPLICATIONS

This application is a continuation of U.S. patent application Ser. No. 16/787,615, filed on Feb. 11, 2020, which claims the benefit of U.S. Provisional Application No. 62/804,746, filed on Feb. 12, 2019, the contents of which are all hereby incorporated by reference herein in its entirety.

TECHNICAL FIELD

The present disclosure relates to mobile communication.

BACKGROUND

With the success in the Evolved Universal Terrestrial Radio Access Network (E-UTRAN) for 4th generation mobile communication, i.e., long term evolution (LTE)/LTE-Advanced(LTE-A), interest in the next-generation, i.e., 5th generation (also known as 5G) mobile communication is rising, and extensive research and development are in process.

A new radio access technology (New RAT or NR) is being researched for the 5th generation (also known as 5G) mobile communication.

For inter-band NR Carrier Aggregation (CA) in mmWave frequency range (e.g. FR 2), operation of User Equipment (UE) and/or gNB (next-generation NodeB) and whether the UE and/or the gNB supports FR 2 inter-band CA or not were not clearly defined. Also, timing requirements, such as MRTD (maximum receive timing difference) and MTTD (maximum transmit timing difference) for the FR 2 inter-band CA were not clearly defined. There is a need to resolve these unclearness.

SUMMARY

Accordingly, a disclosure of the specification has been made in an effort to solve the aforementioned problem.

In accordance with an embodiment of the present disclosure, a disclosure of this specification provides a method for performing communication related to inter-band CA. The method is performed by a wireless communication device. The wireless communication device may receive cell information from a PCell. The cell information may include first information that the PCell is collocated with a SCell within a base station or second information that the PCell is not collocated with the SCell. The PCell and the SCell are configured for the inter-band CA. The wireless communication device may perform communication with at least one of the PCell and the SCell.

In accordance with an embodiment of the present disclosure, a disclosure of this specification provides a method for performing communication related to inter-band CA. The method is performed by a base stating including PCell. The base station may receive capability information related to an antenna type of a wireless communication device. The base station may determine an applicability of the inter-band CA with the PCell and a SCell. The base station may perform communication based on the applicability of the inter-band CA.

In accordance with an embodiment of the present disclosure, a disclosure of this specification provides an apparatus in wireless communication system. The apparatus comprises a processor and a memory coupled to the processor. The processor is configured to obtain cell information from a PCell, wherein the cell information may include first information that the PCell is collocated with a SCell within a base station or second information that the PCell is not collocated with the SCell. The PCell and the SCell are configured for the inter-band CA. The processor is configured to perform communication with at least one of the PCell and the SCell.

According to a disclosure of the present disclosure, the above problem of the related art is solved.

Effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

DETAILED DESCRIPTION OF THE EMBODIMENTS

Figure 1:
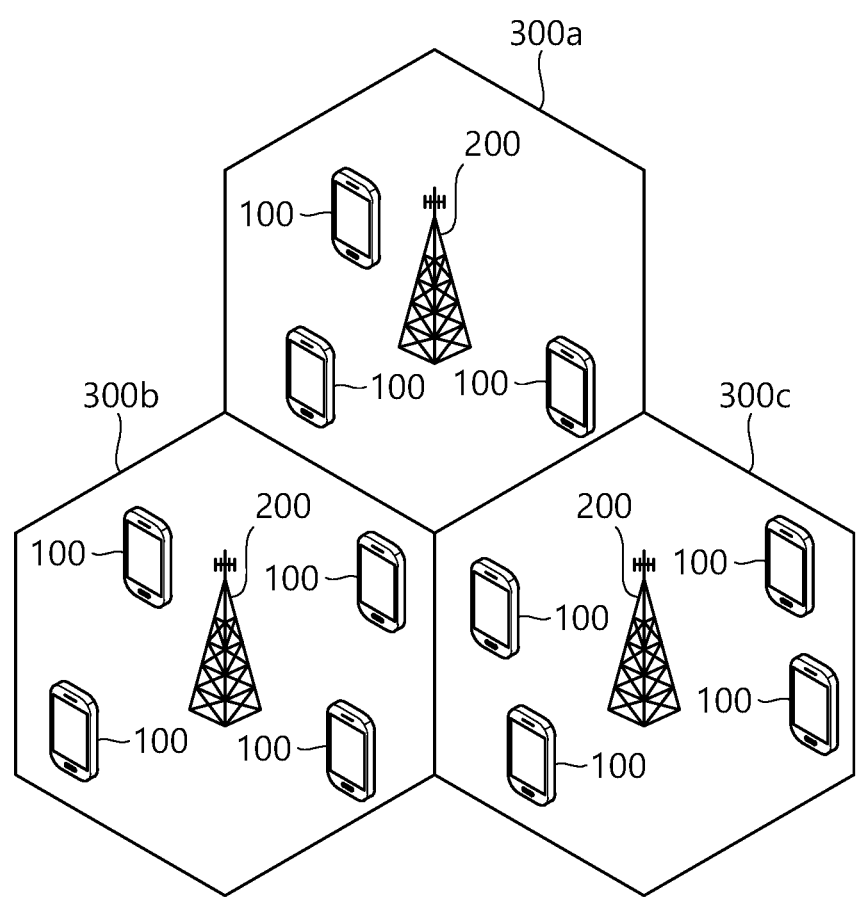
FIG. 1 illustrates a wireless communication system.

Hereinafter, based on 3rd Generation Partnership Project (3GPP) long term evolution (LTE), 3GPP LTE-advanced (LTE-A), 3GPP 5G (5th generation) or 3GPP New Radio (NR), the present specification will be applied. This is just an example, and the present specification may be applied to various wireless communication systems. Hereinafter, LTE includes LTE and/or LTE-A.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Although the present disclosure has been described based on a Universal Mobile Telecommunication System (UMTS), an Evolved Packet Core (EPC), and a next generation (also known as 5th generation or 5G) mobile communication network, the present disclosure will be limited only to the aforementioned communication systems and may, therefore, be applied to all communication system and methods to which the technical scope and spirit of the present disclosure can be applied.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

As used herein, 'base station' generally refers to a fixed station that communicates with a wireless device and may be denoted by other terms such as eNB (evolved-NodeB), BTS (base transceiver system), gNB (next-generation NodeB), or access point.

As used herein, 'user equipment (UE)' may be an example of a wireless communication device such as stationary or mobile. Also, UE may be denoted by other terms such as device, wireless device, terminal, MS (mobile station), UT (user terminal), SS (subscriber station), MT (mobile terminal) and etc.

The following description of this specification may be applied to a next-generation (also known as 5th generation or 5G) mobile communication network.

FIG. 1 Illustrates a Wireless Communication System.

As seen with reference to FIG. 1, the wireless communication system includes at least one base station (BS) 200. Each base station 200 provides a communication service to specific geographical areas (generally, referred to as cells) 300a, 300b, and 300c. The cell can be further divided into a plurality of areas (sectors).

The UE 100 generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 200 to the UE 100 and an uplink means communication from the UE 100 to the base station 200. In the downlink, a transmitter may be a part of the base station 200 and a receiver may be a part of the UE 100. In the uplink, the transmitter may be a part of the UE 100 and the receiver may be a part of the base station 200.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

<Next-Generation Mobile Communication Network>

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2020.

ITU proposes three usage scenarios, for example, enhanced Mobile Broad Band (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wideband.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

Figure 2A:
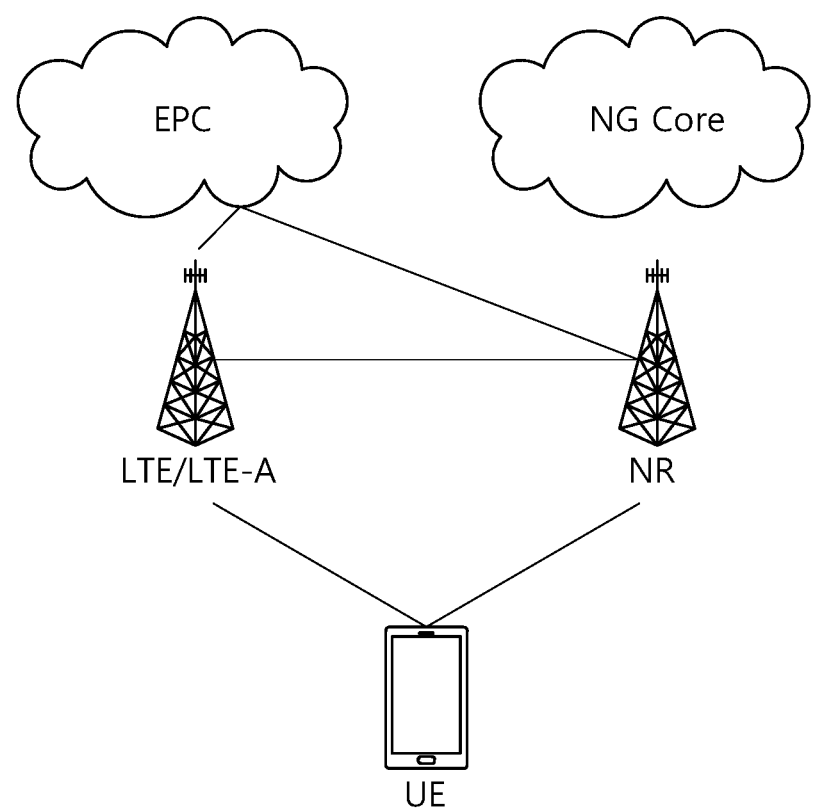
FIGS. 2a to 2c are exemplary diagrams illustrating an exemplary architecture for a service for next-generation mobile communication.
Figure 2B:
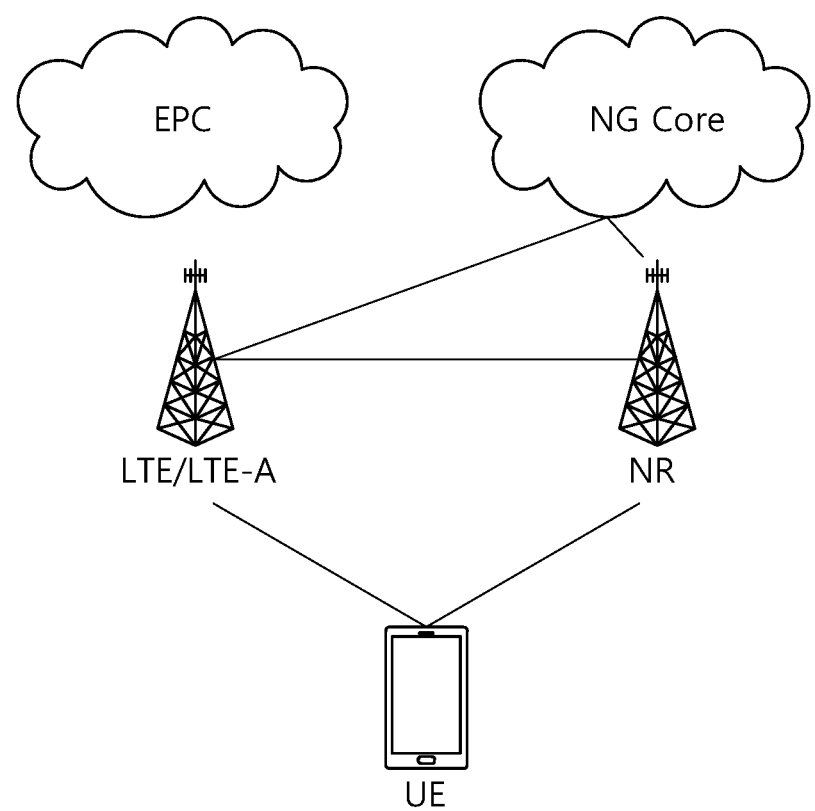
Figure 2C:
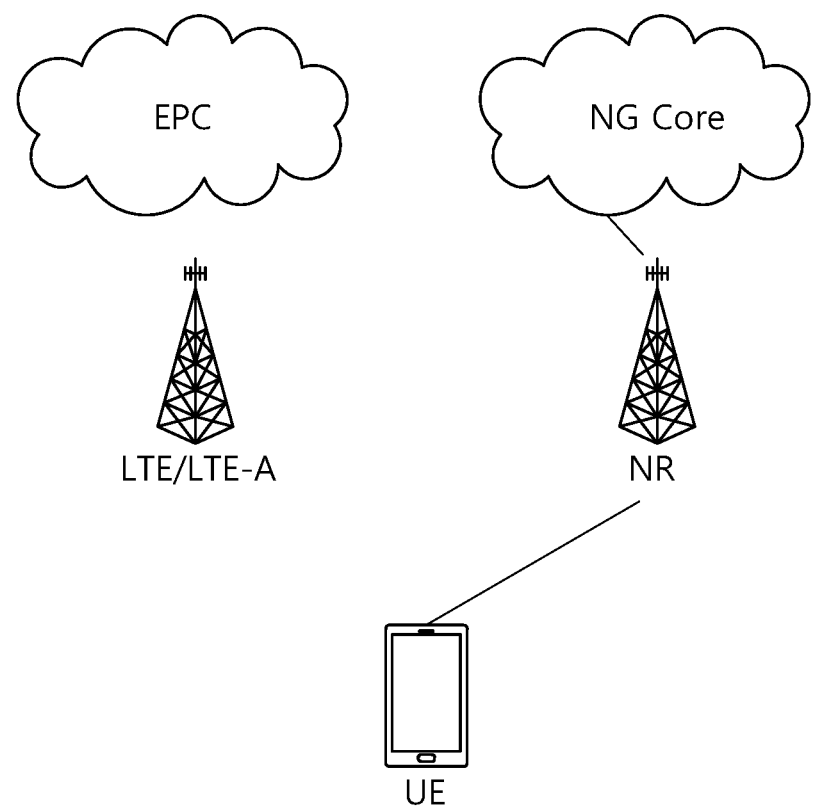

FIGS. 2a to 2c are Exemplary Diagrams Illustrating Exemplary Architectures for Services of the Next Generation Mobile Communication.

Referring to FIG. 2a, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 2b, unlike FIG. 2a, the LTE/LTE-A based cell is connected to a core network for the 5G mobile communication, that is, a next generation (NG) core network.

The service scheme based on the architecture as illustrated in FIGS. 2a and 2B is called non-standalone (NSA).

Referring to FIG. 2c, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

The NR supports a plurality of numerologies (e.g. a plurality of values of subcarrier spacing (SCS)) in order to support various 5G services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

An NR frequency band may be defined as two types (FR1 and FR2) of frequency ranges. The frequency ranges may be changed. For example, the two types (FR1 and FR2) of frequency bands are illustrated in Table 1. For the convenience of description, among the frequency bands used in the NR system, FR1 may refer to a "sub-6-GHz range", FR2 may refer to an "above-6-GHz range" and may be referred to as a millimeter wave (mmWave).

TABLE 1

| Frequency Range Designation | Corresponding Frequency Range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the frequency ranges for the NR system may be changed. For example, FR1 may include a range from 410 MHz to 7125 MHz as illustrated in Table 2. That is, FR1 may include a frequency band of 6 GHz or greater (or 5850, 5900, 5925 MHz, or the like). For example, the frequency band of 6 GHz or greater (or 5850, 5900, 5925 MHz or the like) included in FR1 may include an unlicensed band. The unlicensed band may be used for various uses, for example, for vehicular communication (e.g., autonomous driving).

TABLE 2

| Frequency Range Designation | Corresponding Frequency Range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Table 3 shows examples of operating bands on FR1. Operating bands shown in Table 3 is a reframing operating band that is transitioned from an operating band of LTE/LTE-A. This operating band may be referred to as FR1 operating band.

TABLE 3

| NR operating band | Uplink (UL) operating band $F_{UL\_low}$-$F_{UL\_high}$ | Downlink (DL) operating band $F_{DL\_low}$-$F_{DL\_high}$ | Duplex mode |
| --- | --- | --- | --- |
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

Table 4 shows examples of operating bands on FR2. The following table shows operating bands defined on a high frequency. This operating band is referred to as FR2 operating band.

TABLE 4

| NR operating band | Uplink (UL) operating band $F_{UL\_low}$-$F_{UL\_high}$ | Downlink (DL) operating band $F_{DL\_low}$-$F_{DL\_high}$ | Duplex mode |
| --- | --- | --- | --- |
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-283500 MHz | 27500 MHz-283500 MHz | TDD |

<SS Block in NR>

In 5G NR, the UE defines a physical block channel (PBCH) including information required to perform an initial access, that is, a master information block (MIB) and a synchronization signal SS (including PSS and SSS). In addition, a plurality of SS blocks are bound to be defined as an SS burst, and a plurality of SS bursts are bound to be defined as an SS burst set. Each SS block is assumed to be beamformed in a specific direction, and several SS blocks in the SS burst set are designed to support UEs in different directions.

Figure 3:
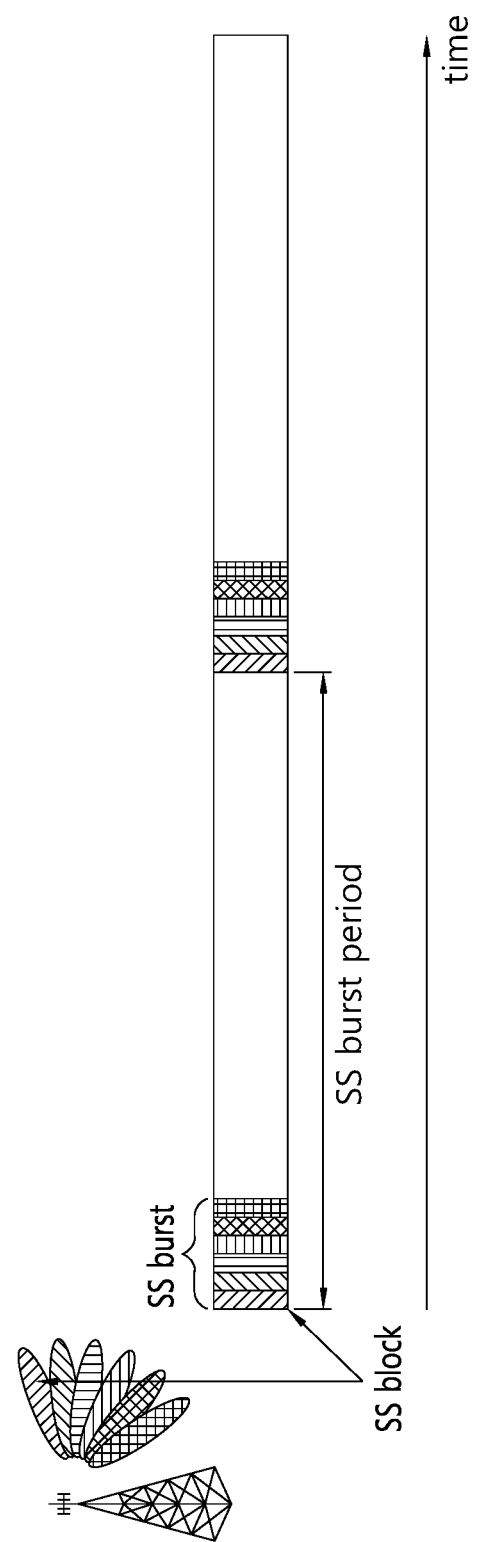
FIG. 3 is an exemplary diagram illustrating an example of an SS block in NR.

FIG. 3 is an Exemplary Diagram Illustrating an Example of an SS Block in NR.

Referring to FIG. 3, the SS burst is transmitted every predetermined periodicity. Therefore, the UE receives the SS block and performs cell detection and measurement.

On the other hand, in 5G NR, beam sweeping is performed on the SS. Hereinafter, it will be described with reference to FIG. 4.

Figure 4:
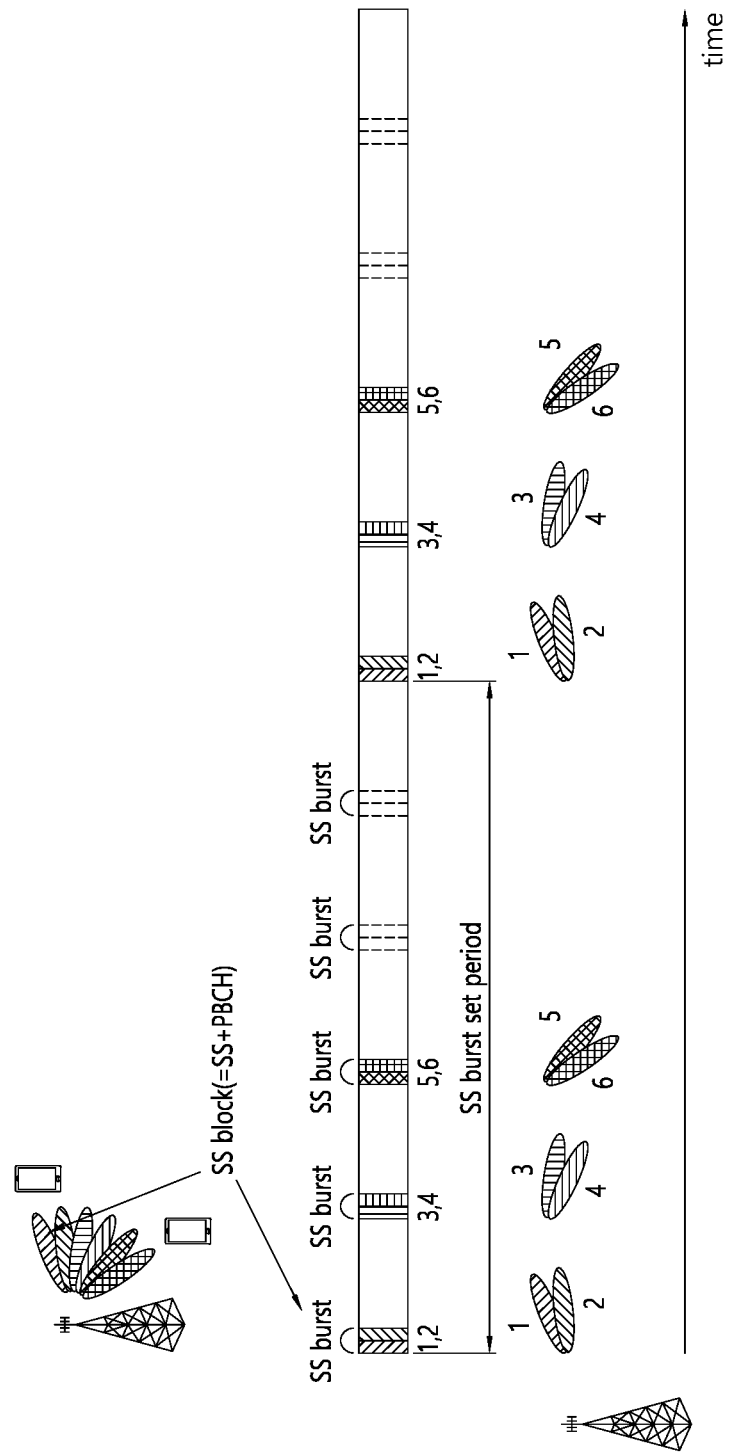
FIG. 4 is an exemplary diagram illustrating an example of beam sweeping in NR.

FIG. 4 is an Exemplary Diagram Illustrating an Example of Beam Sweeping in NR.

The base station transmits each SS block in the SS burst with beam sweeping over time. At this time, the SS blocks in the SS burst set are transmitted in order to support UEs existing in different directions. In FIG. 4, the SS burst set includes SS blocks 1 to 6, and each SS burst includes two SS blocks.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Figure 5:
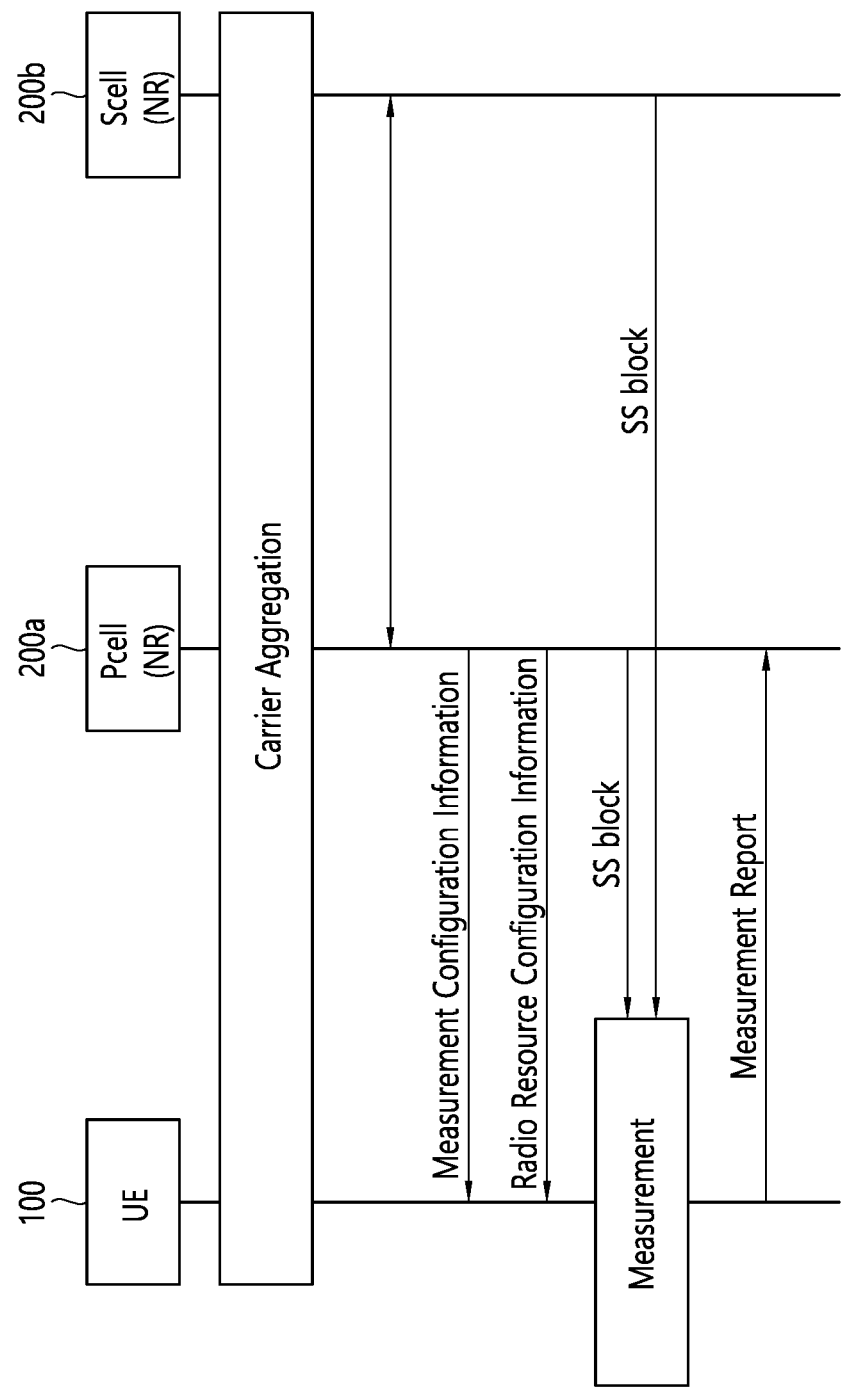
FIG. 5 shows an example of performing measurement in NR carrier aggregation case.

FIG. 5 Shows an Example of Performing Measurement in NR Carrier Aggregation Case.

Referring to FIG. 5, the UE 100 is configured for a carrier aggregation with a first cell (e.g., PCell) and a second cell (e.g. SCell). Here, the Pcell may be an NR based cell, and the Scell may be an NR based cell.

The UE 100 may receive measurement configuration (or "measconfig") information element (IE). The measurement configuration (or "measconfig") IE may include fields shown in the following tables.

Table 5 is an example of the measurement configuration IE. The measurement configuration IE is not limited by examples shown in Table 6, The measurement configuration IE may include different information from the Table 5

TABLE 5

MeasConfig field description measGapConfig
It indicates configuration or cancelation of a measurement gap
s-MeasureConfig
It indicates a threshold value for measurement of NR SpCell (secondary primary cell) RSRP (Reference signal received power) when a UE needs to perform measurement on a non-serving cell.

The above measGapConfig of Table 5 may further include fields. For example, measGapConfig may include fields as examples shown in Table 6. Table 6 shows examples that measGapConfig may further includes. Fields that measGapConfig may further includes are not limited by examples shown in Table 6.

TABLE 6

MeasGapConfig field description gapFR1
It indicates a measurement gap configuration applicable for FR1 frequency range.
gapFR2
It indicates a measurement gap configuration applicable for FR2 frequency range.
gapOffset
It indicates a gap offset of a gap pattern with an MGRP.( Measurement Gap Repetition Period)
mgl
It indicates a measurement gap length by ms. For example, mgl may be 3 ms, 4 ms, 6 ms, etc.
mgrp
It indicates a measurement gap repetition period by ms.
mgta
It indicates whether to apply a timing advance (TA) of 0.5 ms for a measurement gap configuration.

The UE 100 receives a radio resource configuration information element (IE).

The UE 100 performs measurement and reports a measurement result.

<Disclosure of this Specification>

The disclosure of this specification will describe operations of entities within a communication system, such as a UE (as an example of wireless communication device), a base station including a PCell and/or a SCell, etc.

For inter-band NR Carrier Aggregation (CA) in mmWave frequency range (e.g. FR 2), operation of User Equipment (UE) and gNB (next-generation NodeB) and whether the UE and the gNB supports FR 2 inter-band CA or not were not clearly defined. Also, timing requirements, such as MRTD (maximum receive timing difference) and MTTD (maximum transmit timing difference) for the FR 2 inter-band CA were not clearly defined. In this specification signaling toe resolve the unclearness is introduced.

For UE to perform communication based on inter-band CA in NR (hereinafter, also written as inter-band NR CA), minimum requirements are used. As examples of the minimum requirements, timing requirements for inter-band NR CA needs to be satisfied. For example, the timing requirements includes maximum receive timing difference (MRTD) and maximum transmit timing difference (MTTD).

For inter-band NR CA, the requirements of MRTD and MTTD were defined for 3 inter-band NR CA cases such as FR1 inter-band CA, FR2 inter-band CA and FR1+FR2 inter-band CA.

Herein, FR1 inter-band CA may mean inter-band CA configured with operating bands in FR 1. FR2 inter-band CA may mean inter-band CA configured with operating bands in FR2. FR1+FR2 inter-band CA may mean inter-band CA configured with at least one operating band in FR1 and at least one operating band in FR2.

Examples of MRTD and MTTD and detailed description of MTTD and MRTD are written below with Table 7 and Table 8.

Table 7 shows examples of MRTD for 3 inter-band NR CA cases.

TABLE 7

| Frequency Range | Maximum receive timing difference (µs) |
| --- | --- |
| FR1 | 33 |
| FR2 | 8 |
| Between FR1 and FR2 | 25 |

Frequency Range in Table 7 may mean Frequency Range of the pair of carriers configured for the inter-band NR CA.

A UE configured with inter-band NR CA shall be capable of handling a relative receive timing difference among the closest slot timing boundaries of different carriers, each received from
    one PCell configured with pTAG(primary Timing Advance Group) and at least one SCell configured with sTAG(seconday Timing Advance Group), to be aggregated in NR carrier aggregation in SA(NR standalone) or in NE-DC(NR-E-UTRA Dual Connectivity), or
    Cells configured with more than one sTAG, to be aggregated in NR carrier aggregation in EN-DC MRTD may mean allowed maximum value of the relative timing differences among the closest slot timing boundaries of slots, which are respectively received from the different carriers to be aggregated in the NR CA.

For inter-band NR carrier aggregation, the UE shall be capable of handling at least a relative receive timing difference between slot timing of all pairs of carriers to be aggregated at the UE receiver based on MRTD as examples shown in Table 7.

For example, based on Table 7, a UE configured with inter-band NR CA in FR2, relative timing differences among the closest slot timing boundaries of slots, which are respectively received form the different carriers (from a PCell in FR2 and a SCell in FR2) needs to be equal or less than 8 µs.

Table 8 shows examples of MTTD for 3 inter-band NR CA cases.

TABLE 8

| Frequency Range | Maximum transmission timing difference (µs) |
| --- | --- |
| FR1 | 34.6 |
| FR2 | 8.5 |
| Between FR1 and FR2 | 26.1 |

Frequency Range in Table 8 may mean Frequency Range of the pair of carriers configured for the inter-band NR CA.

A UE configured with inter-band NR CA shall be capable of handling a relative transmission timing difference among the closest slot timing boundaries of different carriers, each transmitted to
    one PCell configured with pTAG and at least one SCell configured with sTAG, to be aggregated in NR carrier aggregation in SA(NR standalone) or in NE-DC, or Cells configured with more than one sTAG, to be aggregated in NR carrier aggregation in EN-DC.

MTTD may mean allowed maximum value of the relative transmission timing difference among the closest slot timing boundaries of slots, which are respectively transmitted to the different carries to be aggregated in the NR CA.

For inter-band NR CA, the UE shall be capable of handling at least a relative transmission timing difference between slot timing of all pairs of carriers to be aggregated at the UE transmitter based on MTTD as examples shown in Table 8.

For example, based on Table 8, a UE configured with inter-band NR CA in FR2, relative transmission timing difference among the closest slot timing boundaries of slots, which are respectively transmitted to the different carriers (to a PCell in FR2 and a SCell in FR2) needs to be equal to or less than 8.5 µs.

Figure 6:
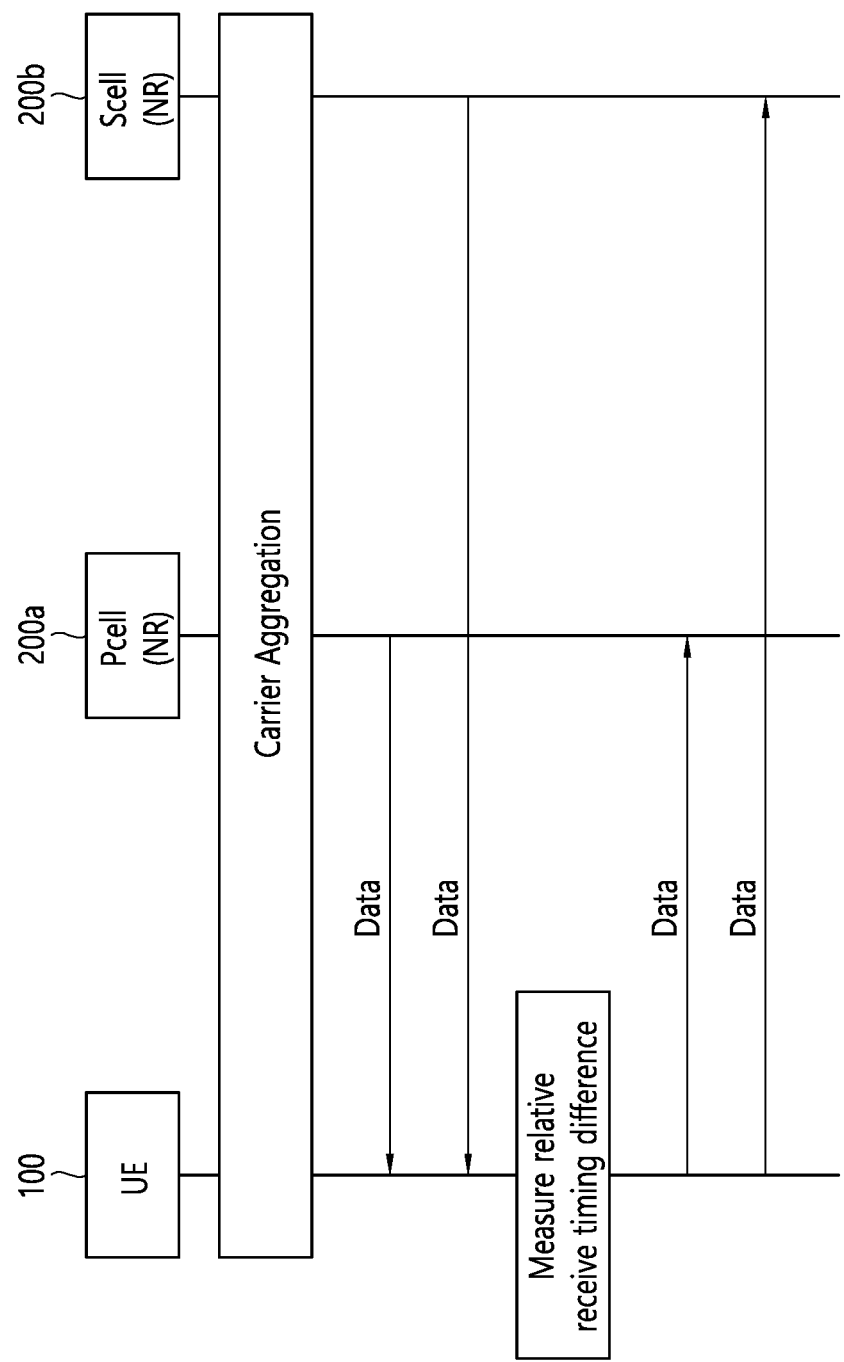
FIG. 6 shows an example of performing communication based on CA in NR.

FIG. 6 Shows an Example of Performing Communication Based on CA in NR.

In FIG. 6, CA is configured for UE 100. PCell 200a and SCell 200b are configured for the CA to the UE 100.

PCell 200a and SCell 200b may transmit data to UE 100.

UE 100 may measure relative receive timing difference between a first receive timing from PCell 200a and a second receive timing form the SCell 200b. The performance of UE 100 is guaranteed to provide that the measured relative receive timing difference does not exceed MRTD (e.g. values MRTD in examples of Table 7).

UE 100 may transmit data to PCell 200a and SCell 200b. Relative timing difference between a first transmission timing to PCell 200a and a second transmission timing to SCell 200b does not exceed MTTD (e.g. values MTTD in examples of Table 8)

As explained with FIG. 6, requirements of MRTD and MTTD are applied to UE 100 configured with NR CA.

The requirements of MRTD of examples shown in Table 7 were defined by taking into account BS TAE(timing alignment error, 3us) and relative propagation delay difference with assumption of non-collocated BS(Base Station) as shown in Table 9.

TABLE 9

| Frequency Range | Maximum transmission timing difference (µs) | TAE(µs) | Propagation delay difference(µs) |
| --- | --- | --- | --- |
| FR1 | 34.6 | 3 | 30 |
| FR2 | 8.5 | 3 | 0 |
| Between FR1 and FR2 | 26.1 | 3 | 5 |

The requirements of MTTD of examples shown in Table 8 were defined by considering MRTD and transmitting timing error as shown in Table 10.

TABLE 10

| Frequency Range | Maximum transmission timing difference (µs) | Maximum receive timing difference (µs) | Transmit timing error(µs) |
| --- | --- | --- | --- |
| FR1 | 34.6 | 33 | 1.6 |
| FR2 | 8.5 | 8 | 0.5 |
| Between FR1 and FR2 | 26.1 | 25 | 1.1 |

"collocated BS" and "BSs are collocated" may mean (i) a BS including a PCell of inter-band NR CA and a BS including a SCell of inter-band NR CA are same (also means that PCell and SCell are collocated within a BS), or (ii) a distance between the BS including the PCell of inter-band NR CA and the BS including the SCell of inter-band NR CA is equal to or less than a predetermined distance (for example, 10 meter).

"non-collocated BS" or "BSs are non-collocated" may mean the BS including the PCell of inter-band NR CA and the BS including the SCell of inter-band NR CA are not collocated. It may also means that the PCell and the SCell are not collocated.

In FR2, beam forming is mandated in UE side. That is, in NR, beam forming is mandated in UE side for performing communication based on operating bands in FR2.

However, when defining MRTD and MTTD for FR2 inter-band NR CA, the beam forming depending on implemented antenna type in the UE side was not considered. The implemented antenna type of the UE may include separated antennas or shared antenna. That is, the UE may be configured with the separated antennas or the shared antenna.

The separated antennas may mean that the UE may perform beam forming independently per an operating band among operating bands configured for FR2 inter-band NR CA simultaneously. The beam forming may be performed by the UE for receiving and/or transmitting signal. That is, the UE configured with separated antennas may perform communication based on beams orienting different directions simultaneously. The shared antenna may mean that the UE may perform single beam forming. The single beam forming may be performed by the UE for receiving and/or transmitting signal. That is, the UE configured with the shared antenna may perform communication based on a single beam orienting one direction.

For example, UE, which is configured for FR2 inter-band NR CA, may perform beam forming independently per an operating band among operating bands configured for FR2 inter-band NR CA or may perform single beam forming for one operating band among operating bands configured for FR2 inter-band NR CA, depending on implemented antenna type. That is why UE antenna can be implemented with separated antennas or shared antenna for supporting FR2 inter-band NR CA.

The current requirements of MRTD and MTTD are applicable for only separated antennas, i.e. UE supporting independent beam forming for FR2 inter-band NR CA. However, using separated antenna per an operating band is not mandated in the UE side. In other words, UE can also perform beam forming with shared antenna for FR2.

So, the impact by different antenna architecture (antenna type) needs to be analyzed and considered for the requirements, such as MRTD and MTTD. Also, a locational relationship (deployment type) of BSs, such as whether BSs for inter-band NR CA are collocated or non-collocated, needs to be considered for the requirements, such as MRTD and MTTD.

Hereinafter, detailed examples and detailed explanation related to FR2 inter-band CA based on antenna type of a UE and/or deployment type of BS (the locational relationship of BSs) are disclosed, but the present specification is not limited thereto. Various technical features may be described herein.

(1) UE capable of FR2 inter-band NR CA with shared antenna.

The UE capable of FR2 inter-band NR CA with shared antenna may perform single beam forming for a corresponding CC (component carrier) at same time. That is, only single beam forming for the corresponding CC is possible for the UE.

In this case, if deployed with non-collocated NR BS (if non-collocated NR BSs are configured for FR2 inter-band NR CA for a UE), the simultaneous transmission or simultaneous reception for FR2 inter-band NR CA cannot be expected for the UE, so that the requirements of MRTD and MTTD, such as examples shown in Table 7 and Table 8, are not applicable.

However, if deployed under collocated BS (if collocated NR BSs are configured for FR2 inter-band NR CA for a UE), the requirements of MRTD and MTTD, such as examples shown in Table 7 and Table 8, can be reused with the requirements for FR2 intra-band non-contiguous NR CA with collocated deployment.

(2) UE capable of FR2 inter-band NR CA with separated antennas.

The UE capable of FR2 inter-band NR CA with separated antenna per operating band, may perform independent beam forming for each CC among CCs, which are configured for the FR2 inter-band CA, at same time. That is, independent beam forming for each CC is possible simultaneously at same time for the UE capable of FR2 inter-band NR CA with the separated antennas.

So, the current requirements of MRTD (8us) and MTTD (8.5us), such as examples shown in Table 7 and Table 8, for FR2 inter-band NR CA are applicable.

As seen above with (1) and (2), the requirements of MRTD and MTTD for FR2 inter-band NR CA can be different(applicable or not applicable) according to deployment type of BSs (collocated BS or non-collocated BS) and antenna type of the UE (UE supporting independent beam forming per band or not).

Referring to exemplary cases shown in the following FIGS. 7 to 9, applicability of FR2 inter-band NR CA and requirements for the FR2 inter-band NR CA based on the antenna type of the UE and/or deployment type of BSs is explained. Also, power saving in addition to the requirements for the FR2 inter-band NR CA is explained.

The following drawings (FIGS. 7 to 18) are created to explain specific examples of the present specification. The names of the specific devices or the names of the specific signals/messages/fields shown in the drawings are provided by way of example, and thus the technical features of the present specification are not limited to the specific names used in the following drawings (FIGS. 7 to 19).

Figure 7:
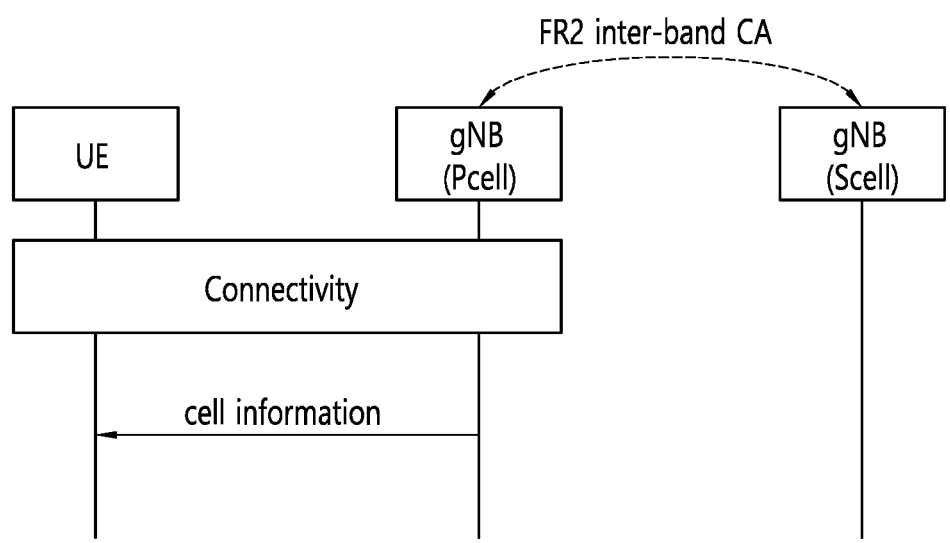
FIG. 7 is a flow chart showing a first example of signaling related to FR 2 inter-band CA according to a disclosure of this specification.

FIG. 7 is a Flow Chart Showing a First Example of Signaling Related to FR 2 Inter-Band CA According to a Disclosure of this Specification.

According to FIG. 7, UE and PCell are connected. PCell may transmit cell information to the UE. The UE may receive cell information from PCell. The cell information informs the UE that PCell and SCell are collocated or non-collocated.

If gNB including PCell transmits the cell information (informing PCell and SCell are collocated or non-collocated) to the UE. The UE may know whether FR2 inter-band CA is supported by the UE or not based on the cell information and capability of the UE (for example, antenna type of the UE). The capability of the UE may includes information related to whether the UE supports independent beam forming per band or not. For example, the capability of the UE includes information related to antenna type of the UE. The antenna type of the UE may be a shared antenna or separated antennas.

In this case, if the UE does not transmit any capability information including the antenna type of the UE to the gNB including PCell, the followings are disclosed.

(1) Non-collocated NR BS (FR2): the cell information informs the UE that PCell and SCell are non-collocated 1-a) UE configured with separated antenna per an operating band (the antenna type of the UE is separated antennas)

The UE can support FR2 inter-band NR CA. It is because the UE may perform independent beam forming per operating bands for PCell and SCell, which are non-collocated.

Requirements of MRTD (8 μs) and MTTD(8.5 μs), as shown in the examples of Table 7 and Table 8, are applicable 1-b) UE configured with shared antenna (the antenna type of the UE is shared antenna)

The UE cannot support FR2 inter-band NR CA. It is because the UE may perform single beam forming for on operating band but PCell and SCell are non-collocated. Thus, the UE cannot receive or transmit signal with respect to PCell and SCell at same time.

Requirements of MRTD and MTTD, such as examples shown in Table 7 and Table 8, are not applicable to the UE. It is because the UE cannot support FR2 inter-band NR CA.

If the UE does not transmit any capability information including the antenna type of the UE (information related to that the UE does not support beam forming per operating band) to the gNB including PCell, the gNB including PCell cannot know that the UE cannot support FR2 inter-band NR CA. That is, there is no way for the gNB to stop configuring FR2 inter-band NR CA to the corresponding UE. Then, even if the gNB configures inter-band NR CA for the UE, the UE may not detect signals from the SCell and may perform communication with the PCell.

(2) Collocated NR BS (FR2): the cell information informs the UE that PCell and SCell are collocated 2-a) UE configured with separated antenna per band (the antenna type of the UE is separated antennas)

The UE can support FR2 inter-band NR CA.

Requirements of MRTD (8 μs) and MTTD(8.5 μs), as shown in examples of Table 7 and Table 8, are applicable. Also, smaller values of the requirements of MRTD and MTTD for intra-band non-contiguous NR CA can be applicable because PCell and SCell are collocated. Based on that the PCell and the SCell are collocated, propagation delay difference of signals each from the PCell and the SCell may be 0, thus the requirements of MRTD and MTTD may become smaller.

The UE may turn off one antenna among separated antennas to save power. In other words, the UE can perform power saving by turning off one antenna among separated antennas. It is because the UE can support NR inter-band CA based on one antenna for collocated PCell and SCell.

2-b) UE configured with shared antenna (the antenna type of the UE is shared antenna)

The UE can support FR2 inter-band NR CA. It is because PCell and SCell are collocated.

Requirements of MRTD (8us) and MTTD (8.5us), such as examples shown in Table 7 and Table 8, are applicable. Also, smaller values of the requirements of MRTD and MTTD for intra-band non-contiguous NR CA can be also applicable because PCell and SCell is collocated. Based on that the PCell and the SCell are collocated, propagation delay difference of signals each from the PCell and the SCell may be 0, thus the requirements of MRTD and MTTD may become smaller.

Figure 8:
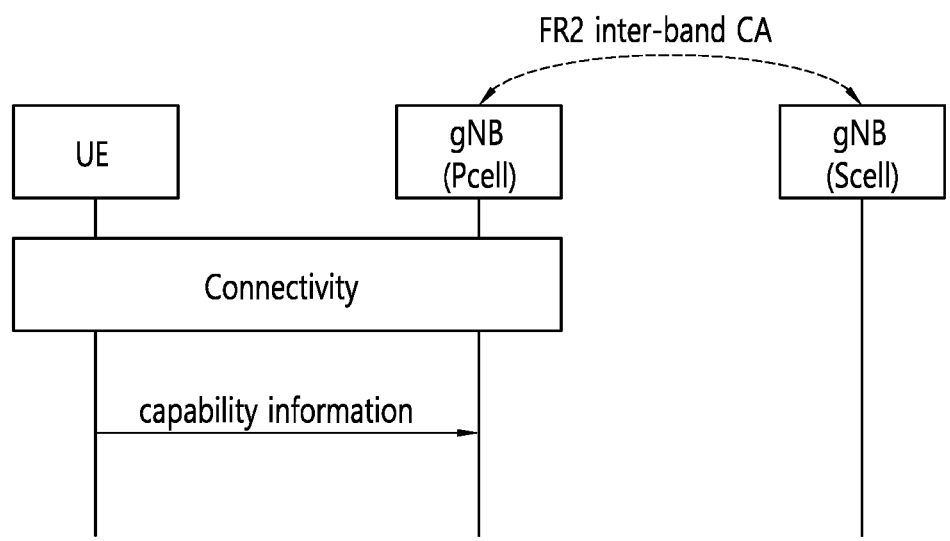
FIG. 8 is a flow chart showing a second example of signaling related to FR 2 inter-band CA according to a disclosure of this specification.

FIG. 8 is a Flow Chart Showing a Second Example of Signaling Related to FR 2 Inter-Band CA According to a Disclosure of this Specification.

According to FIG. 8, UE and PCell are connected. UE may transmit capability information. The capability information includes information related to whether the UE supports independent beam forming per an operating band or not. For example, the capability of the UE includes information related to antenna type of the UE. The antenna type of the UE may be a shared antenna or separated antennas.

Based on reception of the capability information, the PCell may know the capability of the UE. For example, the PCell may know the capability of UE for supporting independent beam forming per operating band, which is configured for FR 2 inter-band NR CA.

If the UE transmits the capability information to the PCell, the PCell can configure FR2 inter-band CA with SCell to the corresponding UE based on the capability information and deployment type of BSs (collocated BS or non-collocated BS). For example, the capability information may includes information that the antenna type of the UE is a shared antenna which does not support the independent beam forming per band for FR 2 inter-band NR CA or includes information that the antenna type of the UE is separated antennas which support the independent beam forming per band for FR 2 inter-band NR CA.

In the second example shown in FIG. 9, if the PCell does not transmit cell information related to the deployment type of BSs, the followings are disclosed.

(1) UE configured with separated antennas supporting beam forming per an operating band.

1-a) Non-collocated NR BS (FR2): the PCell and the SCell are not collocated.

The gNB(PCell) may configure FR2 inter-band NR CA to the corresponding UE.

Requirements of MRTD(8us) and MTTD(8.5us), as shown in the examples of Table 7 and Table 8, are applicable to the UE.

1-b) Collocated NR BS (FR2): the PCell and the SCell are collocated.

The gNB (PCell) may configure FR2 inter-band NR CA to the corresponding UE.

Also, smaller values of the requirements of MRTD and MTTD for intra-band non-contiguous NR CA can be applicable to the corresponding UE because PCell and SCell is collocated. However, Requirements of MRTD (8us) and MTTD(8.5us), as shown in the examples of Table 7 and Table 8, may be applied to the UE, because the UE does not know the deployment type of BSs (the UE does not know that the PCell and the SCell are collocated).

Even if the UE is configured with separated antennas, the UE cannot turn off one of the separated antennas for power saving because the UE does not know the deployment type of BSs that the PCell and the SCell are collocated.

(2) UE configured with a shared antenna, which does not support beam forming per an operating band.

2-a) Non-collocated NR BS (FR2): the PCell and the SCell are not collocated.

The UE configured with the shared antenna cannot support FR 2 inter-band CA. It is because the UE cannot communicate with both of the PCell and the SCell at same time due to single beam forming performed with the shared antenna.

The gNB (PCell) may stop configure FR2 inter-band NR CA with the SCell to the corresponding UE. For example, the gNB (PCell) won't configure FR2 inter-band CA with the SCell to the corresponding UE. It is because the UE configured with the shared antenna cannot perform communication with both of the PCell and the SCell at same time.

Requirements of MRTD and MTTD are not applicable to the UE. It is because the UE cannot support inter-band CA with the PCell and the SCell, which are not collocated.

2-b) Collocated NR BS (FR2): the PCell and the SCell are collocated.

The UE can support FR 2 inter-band NR CA with the PCell and the SCell. It is because the UE may perform beam forming orienting The gNB (PCell) may configure FR2 inter-band CA to the UE.

Also, smaller values of the requirements of MRTD and MTTD for intra-band non-contiguous NR CA can be applicable to the corresponding UE because PCell and SCell is collocated. However, Requirements of MRTD (8us) and MTTD(8.5us), as shown in the examples of Table 7 and Table 8, may be applied to the UE, because the UE does not know the deployment type of BSs (the UE does not know that the PCell and the SCell are collocated).

Figure 9A:
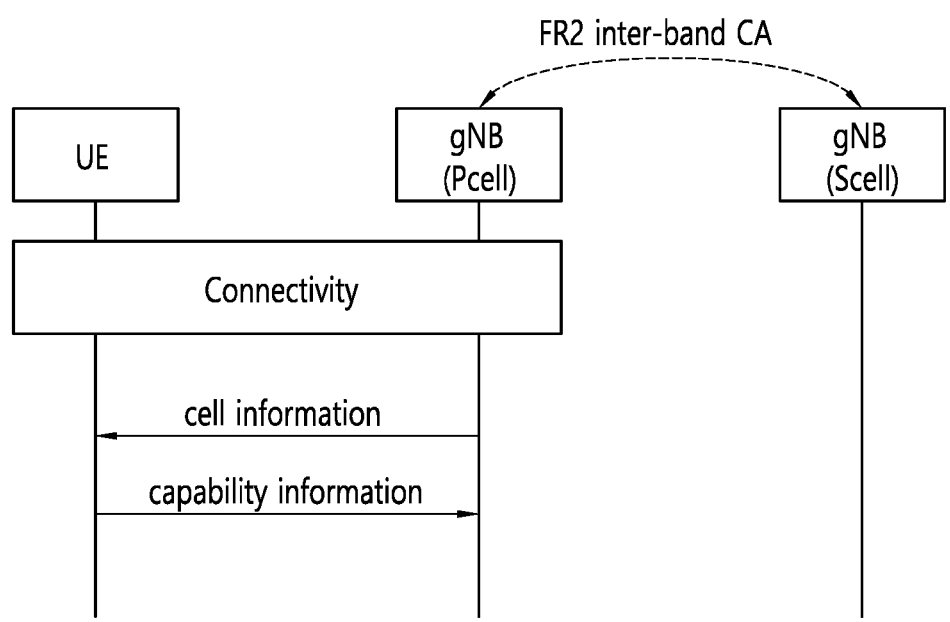
FIGS. 9a and 9b is a flow chart showing a third example of signaling related to FR 2 inter-band CA according to a disclosure of this specification.
Figure 9B:
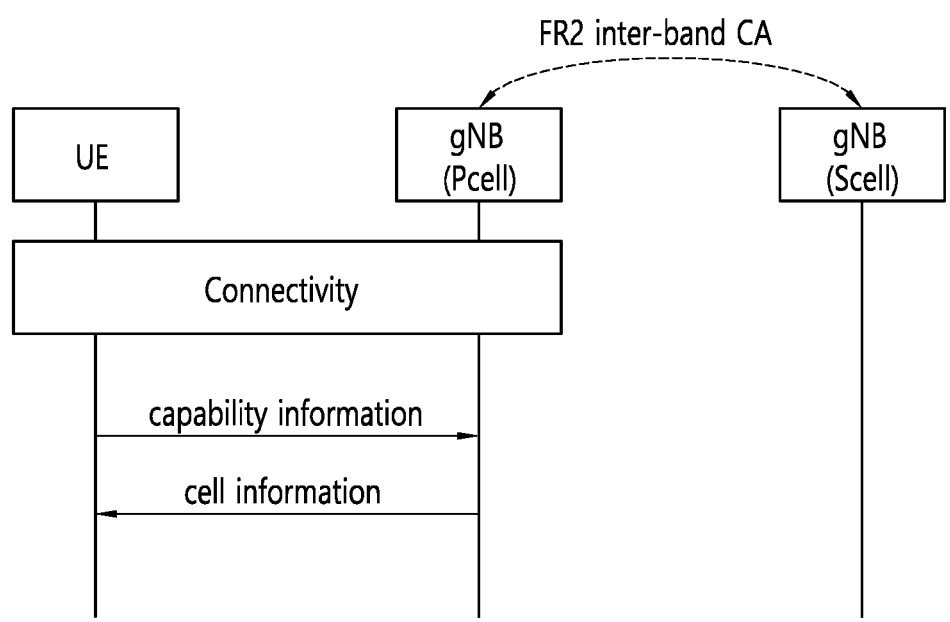

FIGS. 9a and 9b is a Flow Chart Showing a Third Example of Signaling Related to FR 2 Inter-Band CA According to a Disclosure of this Specification.

The third example of signaling related to FR2 inter-band CA is a combination of the first example shown in FIG. 7 and the second example shown in FIG. 8.

The gNB (PCell) may transmit cell information to the UE and the UE may transmit capability information to the gNB (PCell). For example, as shown in FIG. 9a, a transmission of cell information may be performed first and a transmission of capability information may be performed after the transmission of the cell information. For example, as shown in FIG. 9b, a transmission of capability information may be performed first and a transmission of cell information may be performed after the transmission of the capability information.

According to the third example shown in FIGS. 9a and 9b, the UE receives cell information, which is related to that the gNB(PCell) and gNB(the SCell) are collocated or non-collocated. The gNB receives the capability information related to supporting of independent beam forming per an operating band for FR2 inter-band NR CA.

The UE may know whether the PCell and the SCell are collocated or non-collocated based on the cell information. The PCell may know whether the UE is configured with a shared antenna or separated antennas based on the capability information.

The gNB (PCell) gives information of collocated or non-collocated BS to the UE and based on that the UE gives capability information of supporting independent beam forming per band for FR2 inter-band NR CA to gNB. The UE may know whether FR2 inter-band NR CA is supported by the UE or not based on the cell information and the capability information related to supporting independent beam forming per an operating band. The gNB (PCell) may configure the FR2 inter-band NR CA to the UE based on considering the capability information and deployment type (collocated BS or non-collocated BS). In this case, the followings can be disclosed.

(1) Non-collocated NR BS (FR2): the cell information informs the UE that PCell and SCell are non-collocated 1-a) UE configured with separated antenna per an operating band (the antenna type of the UE is separated antennas)

The UE can support FR2 inter-band NR CA. It is because the UE may perform independent beam forming per operating bands for PCell and SCell, which are non-collocated.

The gNB(PCell) may configure FR2 inter-band NR CA to the UE.

Requirements of MRTD(8us) and MTTD(8.5us), as shown in the examples of Table 7 and Table 8, are applicable to the UE.

1-b) UE configured with shared antenna (the antenna type of the UE is shared antenna)

The UE cannot support FR2 inter-band NR CA. It is because the UE may perform single beam forming for on operating band but PCell and SCell are non-collocated. Thus, the UE cannot receive or transmit signal with respect to PCell and SCell at same time.

The gNB (PCell) may stop configure FR2 inter-band NR CA with the SCell to the corresponding UE. For example, the gNB (PCell) won't configure FR2 inter-band CA with the SCell to the corresponding UE. It is because the UE configured with the shared antenna cannot perform communication with both of the PCell and the SCell at same time.

Requirements of MRTD and MTTD are not applicable to the UE. It is because the UE cannot support inter-band CA with the PCell and the SCell, which are not collocated.

(2) Collocated NR BS (FR2): the cell information informs the UE that PCell and SCell are collocated 1-a) UE configured with separated antenna per an operating band (the antenna type of the UE is separated antennas)

The UE can support FR2 inter-band NR CA.

The gNB (PCell) may configure FR2 inter-band CA to the UE.

Requirements of MRTD (8 µs) and MTTD(8.5 µs), as shown in examples of Table 7 and Table 8, are applicable. Also, smaller values of the requirements of MRTD and MTTD for intra-band non-contiguous NR CA can be applicable because PCell and SCell is collocated.

The UE can turn off one antenna among separated antennas to saving power. In other words, the UE can perform power saving by turning off one antenna among separated antennas. It is because the UE can support NR inter-band CA based on one antenna for collocated PCell and SCell.

1-b) UE configured with shared antenna (the antenna type of the UE is shared antenna)

The UE can support FR2 inter-band NR CA.

The gNB (PCell) may configure FR2 inter-band CA to the UE.

Requirements of MRTD (8 µs) and MTTD(8.5 µs), as shown in examples of Table 7 and Table 8, are applicable. Also, smaller values of the requirements of MRTD and MTTD for intra-band non-contiguous NR CA can be applicable because PCell and SCell is collocated.

According to 3 examples as explained above with FIGS. 7 to 9b, the current requirements of MRTD(8us) and MTTD (8.5us), as shown in examples of Table 7 and Table 8, for FR2 inter-band NR CA are limited to be applied to UE configured with separated beams. The UE configured with the separated beams supports simultaneously independent beam forming under non-collocated NR BS.

The current requirements of MRTD and MTTD for FR 2 inter-band CA need to be revised by considering the deployment type of BSs (collocated BS or non-collocated BS) and UE capability of supporting independent beam forming per an operating band. The current MRTD and MTTD for FR2 inter-band CA need to be revised based on the 3 examples explained above with FIGS. 7 to 9b.

For revising the current requirements of MRTD and MTTD, signaling of the cell information includes deployment type of BS and/or signaling of capability information includes UE capability supporting independent beam forming per an operating band are needed.

The following note may be added to requirements for MRTD and MTTD. The following note may be added by considering deployment type of BS and UE capability supporting independent beam forming per an operating band.

Note 1:: If Cells to be aggregated in inter-band NR CA are non-collocated, it is not applicable for UE not supporting independent beam forming. If the cells are collocated, 3 us is also applicable.

In Note 1, an example of Cells to be aggregated in the inter-band NR CA may be a PCell and a SCell.

The following Table 11 and Table 12 are examples of adding the Note 1, which is explained above, to Table 7 and Table 8.

TABLE 11

| Frequency Range | Maximum receive timing difference (µs) |
| --- | --- |
| FR1 | 33 |
| FR2 | 8 (Note 1) |
| Between FR1 and FR2 | 25 |

Note 1
If Cells to be aggregated in inter-band NR CA are non-collocated, it is not applicable for UE not supporting independent beam forming. If the cells are collocated, 3 µs is also applicable.

TABLE 12

| Frequency Range | Maximum transmission timing difference (µs) |
| --- | --- |
| FR1 | 34.6 |
| FR2 | 8.5 (Note 1) |
| Between FR1 and FR2 | 26.1 |

Note 1
If Cells to be aggregated in inter-band NR CA are non-collocated, it is not applicable for UE not supporting independent beam forming. If the cells are collocated, 3 µs is also applicable.

Signaling of information related to deployment type of BS for FR2 inter-band NR CA may be defined. For example, PCell may transmit cell information, which includes first information that the PCell is collocated with SCell within a base station or second information that the PCell is not collocated with the SCell to UE.

Signaling of UE capability information related to that the UE supports independent beam forming per an operating band for FR2 may be defined. For example, a UE may transmit capability information to PCell. The capability information may include information related to antenna type of the UE. The antenna type of the UE may be configured as a shared antenna or separated antennas for supporting independent beam forming per an operating band for FR2 inter-band CA.

Requirements for MRTD and MTTD for FR 2 inter-band NR CA by considering the deployment type of BSs (collocated BS or non-collocated BS) and UE capability of supporting independent beam forming per an operating band may be defined.

The following Table 13 and Table 14 are examples of requirements for MRTD and MTTD for FR 2 inter-band NR CA by considering the deployment type of BSs and UE capability.

TABLE 13

| Frequency Range | Maximum receive timing difference (μs) | gNB deployment type | UE capability of supporting independent beam forming per band |
|---|---|---|---|
| FR1 | 33 | | |
| FR2 | 8 | Non-collocated | Yes |
| | Not applicable | Non-collocated | No |
| | 8 | Collocated | Yes |
| | 8 | Collocated | No |
| Between FR1 and FR2 | 25 | | |

Table 13 shows examples of requirements for MRTD. For example, if gNB deployment type is non-collocated and the UE is configured with a shared antenna, MRTD is not applicable for FR 2 inter-band CA.

TABLE 14

| Frequency Range | Maximum transmission timing difference (μs) | gNB deployment type | UE capability of supporting independent beam forming per band |
|---|---|---|---|
| FR1 | 34.6 | | |
| FR2 | 8.5 | Non-collocated | Yes |
| | Not applicable | Non-collocated | No |
| | 8.5 | Collocated | Yes |
| | 8.5 | Collocated | No |
| Between FR1 and FR2 | 26.1 | | |

Table 14 shows examples of requirements for MTTD. For example, if gNB deployment type is non-collocated and the UE is configured with a shared antenna, MTTD is not applicable for FR 2 inter-band CA.

The following Table 15 and Table 16 are another examples of the requirements for MRTD and MTTD for FR 2 inter-band NR CA by considering the deployment type of BSs and UE capability. For collocated NR BS(PCell and SCell are collocated), the requirements of FR2 intra-band non-contiguous NR CA are reused for MRTD and MTTD for FR2 inter-band NR CA. For example, MRTD is 3 us and MTTD is not defined for the requirements of FR 2 intra-band non-contiguous NR CA. MRTD of 3 us and MTTD that is not defined may be revised if MRTD and MTTD for FR2 intra-band non-contiguous NR CA are changed. For example, MRTD may be 4 us and MTTD may be 5 us.

TABLE 15

| Frequency Range | Maximum receive timing difference (μs) | gNB deployment type | UE capability of supporting independent beam forming per band |
|---|---|---|---|
| FR1 | 33 | | |
| FR2 | 8 | Non-collocated | Yes |
| | Not applicable | Non-collocated | No |

TABLE 15-continued

| Frequency Range | Maximum receive timing difference (μs) | gNB deployment type | UE capability of supporting independent beam forming per band |
|---|---|---|---|
| | 3 | Collocated | Yes |
| | 3 | Collocated | No |
| Between FR1 and FR2 | 25 | | |

Table 15 shows examples of requirements for MRTD. For example, if gNB deployment type is non-collocated and the UE is configured with a shared antenna, MRTD is not applicable for FR 2 inter-band CA. For example, if gNB deployment type is collocated, MRTD of 3 us is applicable for FR 2 inter-band CA.

TABLE 16

| Frequency Range | Maximum transmission timing difference (μs) | gNB deployed type | UE capability of supporting independent beam forming per band |
|---|---|---|---|
| FR1 | 34.6 | | |
| FR2 | 8.5 | Non-collocated | Yes |
| | Not applicable | Non-collocated | No |
| | Not define | Collocated | Yes |
| | Not define | Collocated | No |
| Between FR1 and FR2 | 26.1 | | |

Table 16 shows examples of requirements for MTTD. For example, if gNB deployment type is non-collocated and the UE is configured with a shared antenna, MTTD is not applicable for FR 2 inter-band CA. For example, if gNB deployment type is collocated, MTTD not defined or MTTD of 5 us is applicable for FR 2 inter-band CA.

Figure 10:
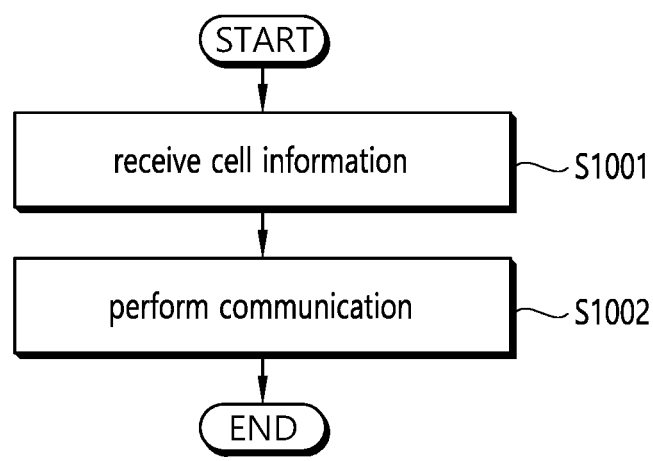
FIG. 10 is a flow chart showing an example of operation of wireless communication device according to a disclosure of this specification.

FIG. 10 is a Flow Chart Showing an Example of Operation of Wireless Communication Device According to a Disclosure of this Specification.

FIG. 10 shows an example of the operation of the wireless communication device (e.g. UE). The wireless communication device may perform operations, explained above with FIGS. 1 to 9b, related to the UE. Operation of the UE is not limited to FIG. 10.

In step S1001, the wireless communication device may receive cell information form a PCell. The cell information may include first information that the PCell is collocated with a SCell within a base station or second information that the PCell is not collocated with the SCell. The SCell and the PCell may use different operating bands to be configured for the inter-band CA.

In step S1002, the wireless communication device may perform communication. For example, the wireless communication device may perform the communication with at least one of the PCell and the SCell. The PCell and the SCell may be configured for the inter-band CA. The communication may be performed based on the cell information and an antenna type of the wireless communication device.

The antenna type of the wireless communication device may be configured as a shared antenna for operating bands or separated antennas for each of the operating bands.

The communication may be performed with both of the PCell and the SCell, based on that the antenna type of the wireless communication device is configured as the separated antennas and based on that the second information is included in the cell information.

The communication may be performed with the PCell, based on that the antenna type of the wireless communication device is configured as the shared antenna and based on that the second information is included in the cell information.

MRTD and/or MTTD may be applied to the wireless communication device while performing the communication.

For example, the communication with the both of the Pcell and SCell may be performed based on a relative receive timing difference between a first receive timing from the Pcell and a second receive timing from the SCell. The relative receiving timing difference may not exceed MRTD.

The communication with the both of the PCell and SCell may be performed such that a relative transmission timing difference between a first transmission timing to the Pcell and a second transmission timing to the SCell. The relative transmission timing difference may not exceed a maximum transmission timing difference.

MRTD may be set based on the cell information and the antenna type of the wireless communication device. For example, Table 7, 9, 11, 13 and/or 15 may be used for the MRTD MTTD may be set based on the cell information and the antenna type of the wireless communication device. For example, Table 8, 19, 12, 14 and/or 16 may be used for the MTTD.

Before or after step S1001 is performed, the wireless communication device may transmit capability information related to the antenna type of the wireless communication device to the PCell. The capability information may inform the PCell that the wireless communication device is configured with the shared antenna or separated antennas.

Figure 11:
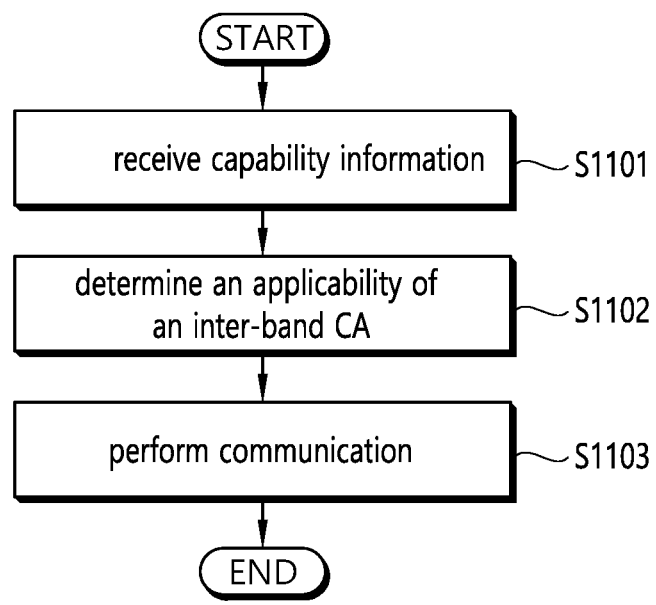
FIG. 11 is a flow chart showing an example of operation of base station according to a disclosure of this specification.

FIG. 11 is a flow chart showing an example of operation of base station according to a disclosure of this specification.

FIG. 11 shows an example of the operation of the base station, which includes PCell. The base station may perform operations, explained above with FIGS. 1 to 9b, related to the PCell, base station and gNB. Operation of the base station is not limited to FIG. 11.

In step S1101, the base station may receive capability information from a wireless communication device. The capability information is related to an antenna type of the wireless communication device.

In step S1102, the base station may determine an applicability of the inter-band CA. For example, the base station may determine the applicability of the inter-band CA with the PCell and a SCell based on the capability information and cell information. The cell information may include first information that the PCell is collocated with the SCell within the base station or second information that the PCell is not collocated with the SCell. The SCell and the PCell use different operating bands to be configured for the inter-band CA.

For example, the applicability of the inter-band CA may be determined to be applicable, based on that the first information is included in the cell information. For example, the applicability of the inter-band CA may be determined to be applicable, based on that the antenna type of the wireless communication device is separated antennas and based on that the second information is included in the cell information. For example, the applicability of the inter-band CA may be determined to be not applicable, based on that the antenna type of the wireless communication device is a shared antenna and based on that the second information is included in the cell information.

The base station may transmit the cell information to the wireless communication device. The cell information may informs the wireless communication device that the PCell and SCell are collocated or not collocated.

In step S1103, the base station may perform communication based on the applicability of the inter-band CA.

The base station may perform the communication based on configuring inter-band CA or not configuring inter-band CA according to the applicability of the inter-band CA. For example, the base station may configure the inter-band CA with the PCell and the SCell, based on that the applicability of the inter-band CA is determined to be applicable. For example, the base station may not configure the inter-band CA with the PCell and the SCell, based on that the applicability of the inter-band CA is determined to be not applicable.

<Communication System to which the Disclosure of this Specification is to be Applied>

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 12:
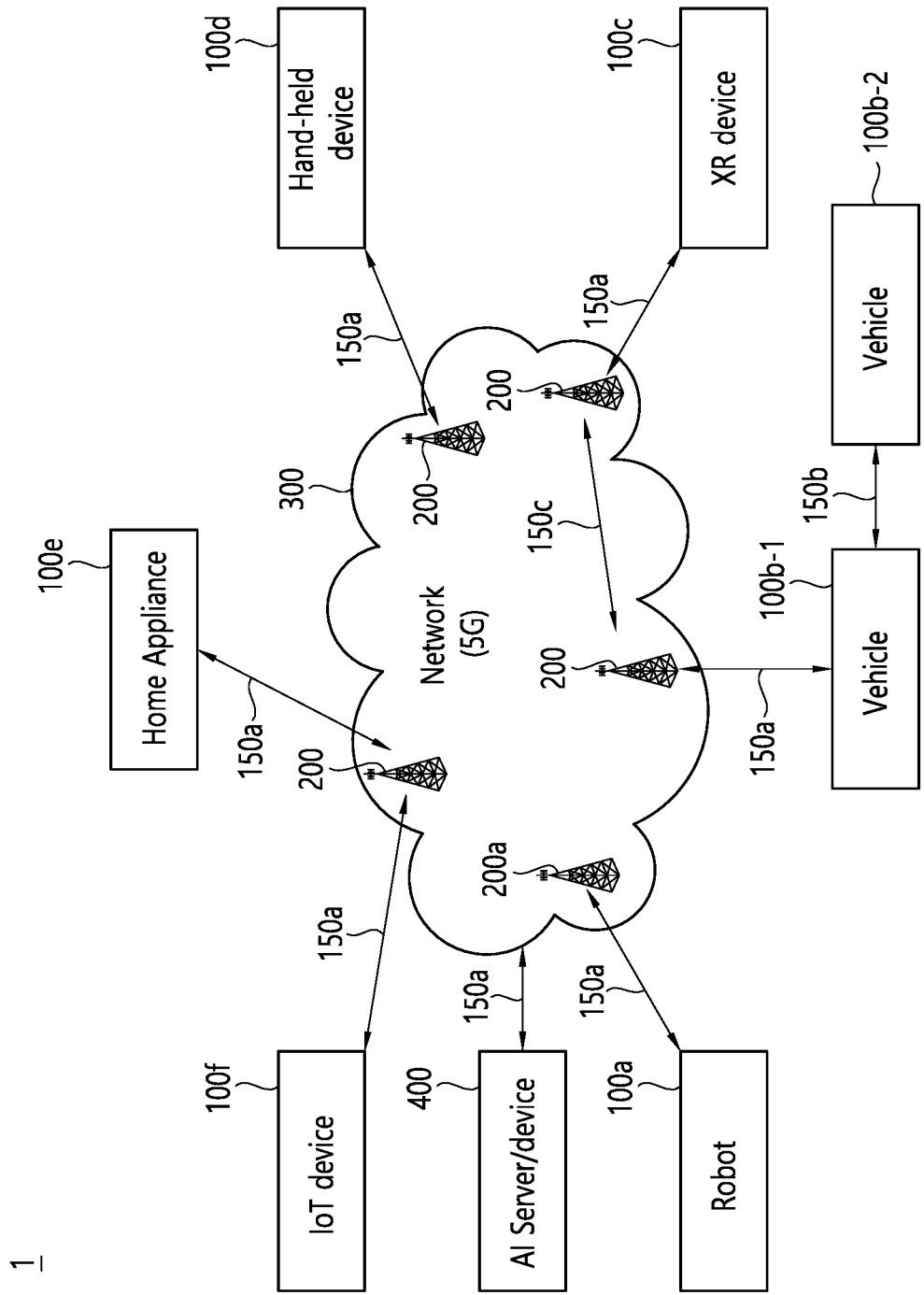
FIG. 12 illustrates a communication system 1 that can be applied to the present specification.

FIG. 12 Illustrates a Communication System 1 that can be Applied to the Present Specification.

Referring to FIG. 12, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device.

Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like.

Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like.

The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300.

The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/ base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like.

The wireless device and the base station/wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

Figure 13:
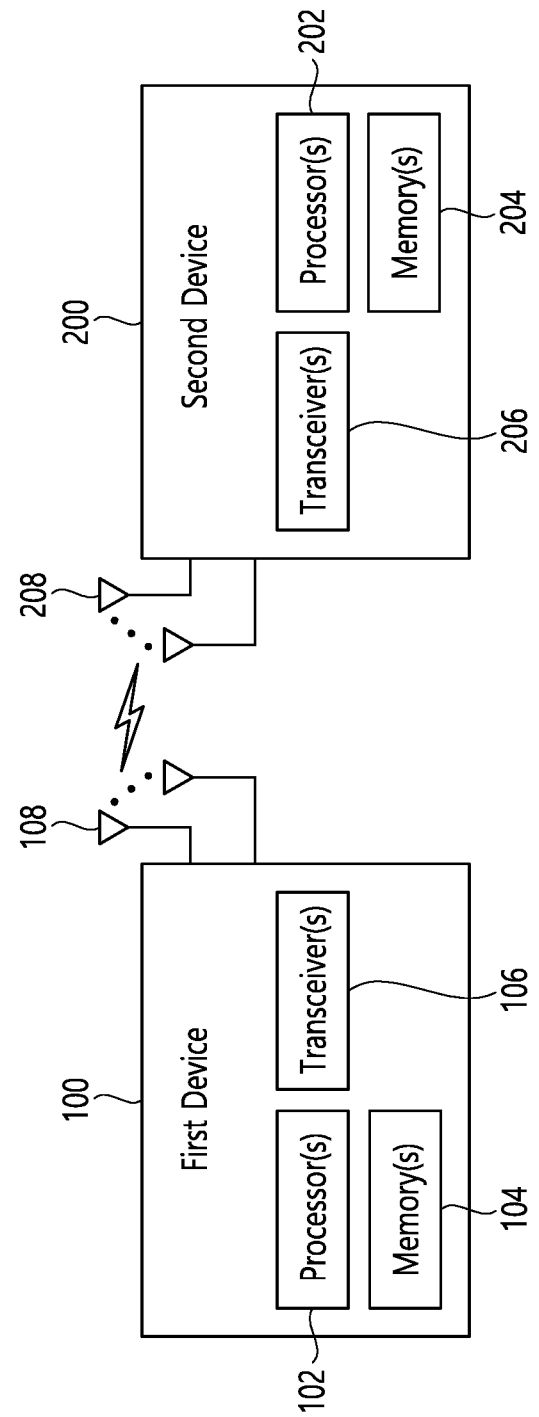
FIG. 13 illustrates an example of a wireless device that can be applied to the present specification.

FIG. 13 Illustrates an Example of a Wireless Device that can be Applied to the Present Specification.

Referring to FIG. 13, the first wireless device 100 and the second wireless device 200 may transmit and receive wireless signals through various wireless access technologies (e.g., LTE and NR). Here, the {first wireless device 100 and the second wireless device 200} may refer to the {wireless device 100x, the base station 200} and/or the {wireless device 100x, the wireless device 100x of FIG. 12}. Here, x of 100x may be at least one of a, b-1, b-2, c, d, f, e.

The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein.

For example, the processor 102 may process the information in the memory 104 to generate a first information/ signal, and then transmit the wireless signal including the first information/signal through the transceiver 106. In addition, the processor 102 may receive the radio signal including a second information/signal through the transceiver 106 and store the information obtained from the signal processing of the second information/signal in the memory 104.

The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein.

Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein.

For example, the processor 202 may process the information in the memory 204 to generate third information/ signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204.

The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein.

Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described being mixed with an RF unit. In the present specification, a wireless device may mean a communication modem/circuit/ chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto.

For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs) and/or one or more Service Data Units (SDUs) based on the descriptions, functions, procedures, suggestions, methods and/or operational flowcharts disclosed herein.

One or more processors 102, 202 may generate messages, control information, data or information in accordance with the descriptions, functions, procedures, suggestions, methods and/or operational flowcharts disclosed herein.

One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206.

One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

One or more processors 102, 202 may be referred to as a controller, microcontroller, microprocessor, or microcomputer. One or more processors 102, 202 may be implemented by hardware, firmware, software, or a combination thereof.

For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102, 202.

The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals.

For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208.

In the present specification, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

Figure 14:
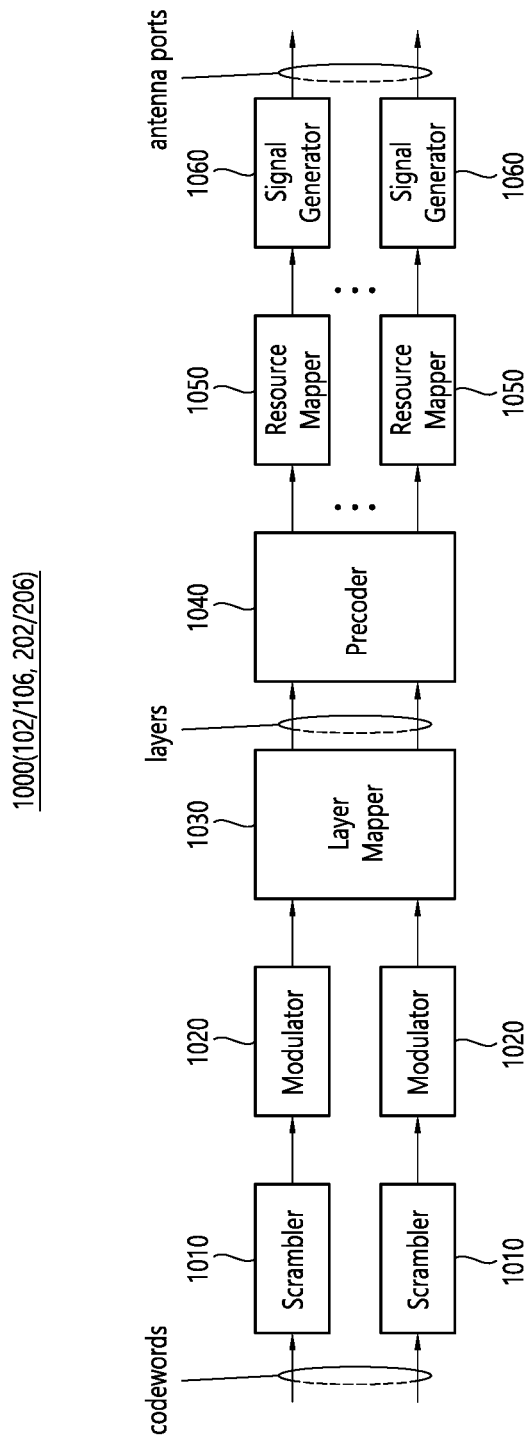
FIG. 14 illustrates an example of a signal processing circuit for a transmission signal that can be applied to the present specification.

FIG. 14 Illustrates an Example of a Signal Processing Circuit for a Transmission Signal that can be Applied to the Present Specification.

Referring to FIG. 14, the signal processing circuit 1000 may include a scrambler 1010, a modulator 1020, a layer mapper 1030, a precoder 1040, a resource mapper 1050, and a signal generator 1060.

Although not limited thereto, the operations/functions of FIG. 14 may be performed in the processor (102, 202), the memory (104, 204) and/or transceiver (106, 206) of FIG. 13.

The hardware element of FIG. 14 may be implemented in the processors 102 and 202 and/or the transceivers 106 and 206 of FIG. 13. For example, blocks 1010-1060 may be implemented in the processors 102, 202 of FIG. 13. Also, blocks 1010-1050 may be implemented in the processors 102 and 202 of FIG. 13, and block 1060 may be implemented in the transceivers 106 and 206 of FIG. 13.

The codeword may be converted into a wireless signal through the signal processing circuit 1000 of FIG. 14. Here, the codeword is an encoded bit sequence of the information block. The information block may include a transport block (e.g., a UL-SCH transport block and a DL-SCH transport block). The wireless signal may be transmitted through various physical channels (e.g., PUSCH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like.

The complex modulation symbol sequence may be mapped to one or more transport layers by the layer mapper 1030. The modulation symbols of each transport layer may be mapped (precoding) to the corresponding antenna port (s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010~1060 of FIG. 14. For example, a wireless device (e.g., 100 and 200 of FIG. 13) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a postcoder, a demodulator, a de-scrambler and a decoder.

Figure 15:
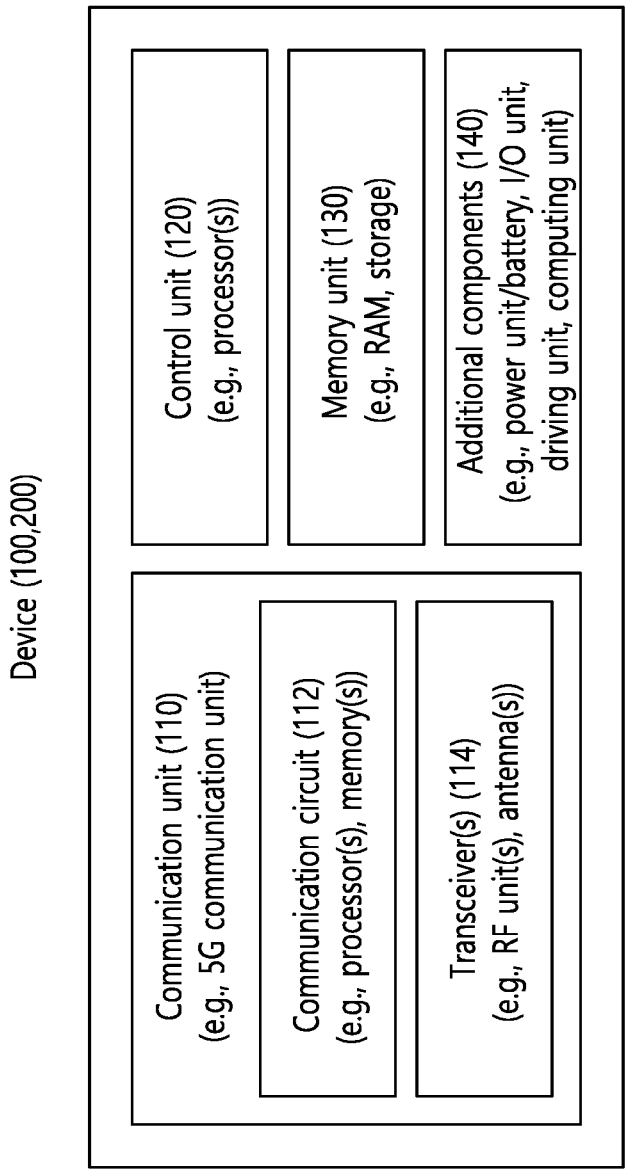
FIG. 15 illustrates another example of a wireless device that can be applied to the present specification.

FIG. 15 Illustrates Another Example of a Wireless Device that can be Applied to the Present Specification.

The wireless device may be implemented in various forms according to a use-example/service (see FIGS. 12 and 16-18).

Referring to FIG. 15, the wireless devices 100 and 200 correspond to the wireless devices 100 and 200 of FIG. 13, and the wireless devices 100 and 200 may be configured with various elements, components, units, and/or modules.

For example, the wireless device 100, 200 may include a communication unit 110, a control unit 120, a memory unit 130, and additional components 140. The communication unit may include communication circuit 112 and transceiver (s) 114.

For example, the communication circuit 112 may include one or more processors 102, 202 and/or one or more memories 104, 204 of FIG. 13. For example, the transceiver (s) 114 may include one or more transceivers 106, 206 and/or one or more antennas 108, 208 of FIG. 13.

The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130.

In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 13. For example, the memory unit 130 may include one or more memories 104 and 204 of FIG. 13.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 12, 100*a*), a vehicle (FIG. 12, 100*b*-1, 100*b*-2), an XR device (FIG. 12, 100*c*), a portable device (FIG. 12, 100*d*), a home appliance. (FIG. 12, 100*e*), IoT devices (FIG. 12, 1000, terminals for digital broadcasting, hologram devices, public safety devices, MTC devices, medical devices, fintech devices (or financial devices), security devices, climate/environment devices, an AI server/device (FIGS. 12 and 400), a base station (FIGS. 12 and 200), a network node, and the like. The wireless device may be used in a mobile or fixed location depending on the usage-example/service.

In FIG. 15, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Hereinafter, the implementation example of FIG. 15 will be described in more detail with reference to the accompanying drawings.

Figure 16:
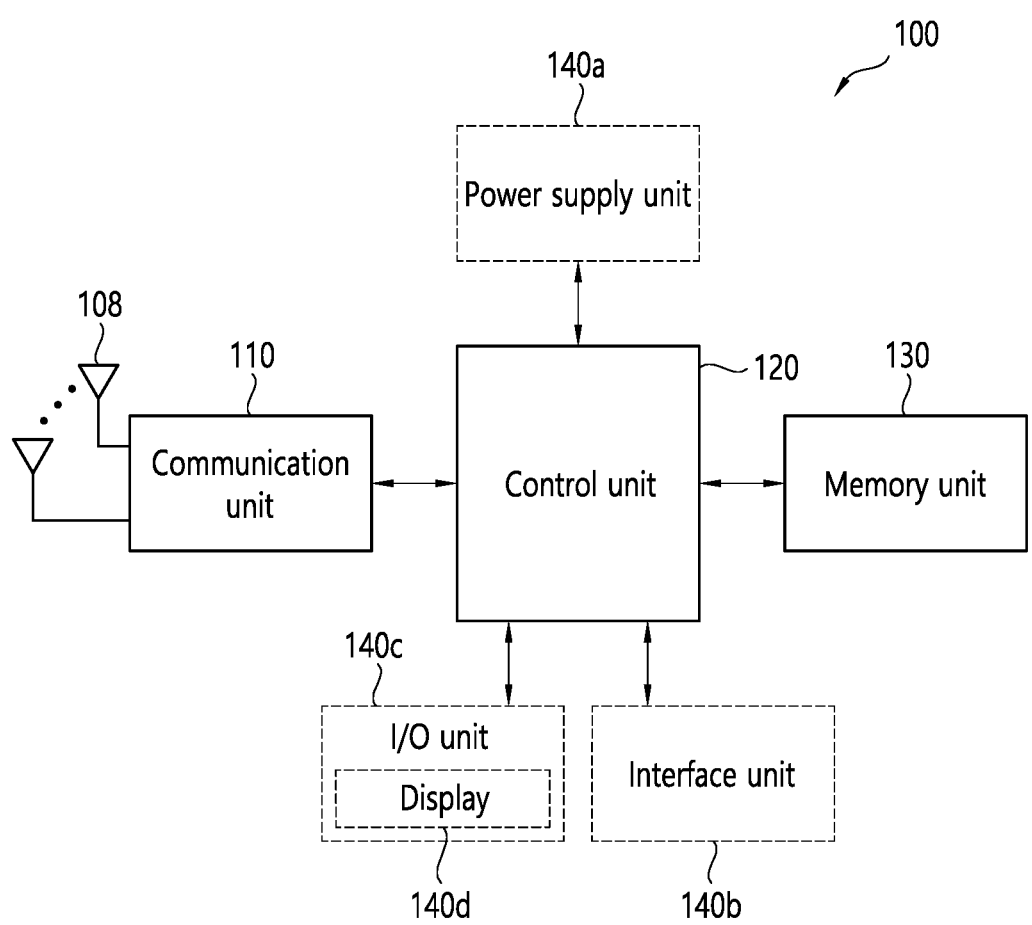
FIG. 16 illustrates an example of a portable device that can be applied to the present specification.

FIG. 16 Illustrates an Example of a Mobile Device that can be Applied to the Present Specification.

The mobile device may include a smart phone, a smart pad, a wearable device (e.g., smart watch, smart glasses), and a portable computer (e.g., a laptop, etc.). The mobile device may be referred to as a mobile station (MS), a user terminal (UT), a mobile subscriber station (MSS), a subscriber station (SS), an advanced mobile station (AMS), or a wireless terminal (WT).

Referring to FIG. 16, the portable device 100 includes an antenna unit 108, a communication unit 110, a control unit 120, a memory unit 130, a power supply unit 140*a*, an interface unit 140*b*, and an input/output unit 140*c*. The antenna unit 108 may be configured as part of the communication unit 110. Blocks 110 to 130/140*a* to 140*c* respectively correspond to blocks 110 to 130/140 of FIG. 15.

The communication unit 110 may transmit and receive signals (e.g., data, control signals, etc.) with other wireless devices and base stations. The control unit 120 may control various components of the portable device 100 to perform various operations. The control unit 120 may include an application processor (AP). The memory unit 130 may store data/parameters/programs/codes/commands necessary for driving the portable device 100. In addition, the memory unit 130 may store input/output data/information and the like.

The power supply unit 140*a* supplies power to the portable device 100 and may include a wired/wireless charging circuit, a battery, and the like. The interface unit 140*b* may support the connection of the mobile device 100 to another external device. The interface unit 140*b* may include various ports (e.g., audio input/output port and video input/output port) for connecting to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in the case of data communication, the input/output unit 140c obtains information/signals (e.g., touch, text, voice, image, and video) input from a user, and the obtained information/signal may be stored in a memory unit 130. The communication unit 110 may convert the information/signal stored in the memory unit 130 into a wireless signal and directly transmit the converted wireless signal to another wireless device or to the base station. In addition, the communication unit 110 may receive a radio signal from another wireless device or a base station, and then restore the received radio signal to original information/signal. The restored information/signal may be stored in the memory unit 130 and then output in various forms (e.g., text, voice, image, video, and haptic) through the input/output unit 140c.

Figure 17:
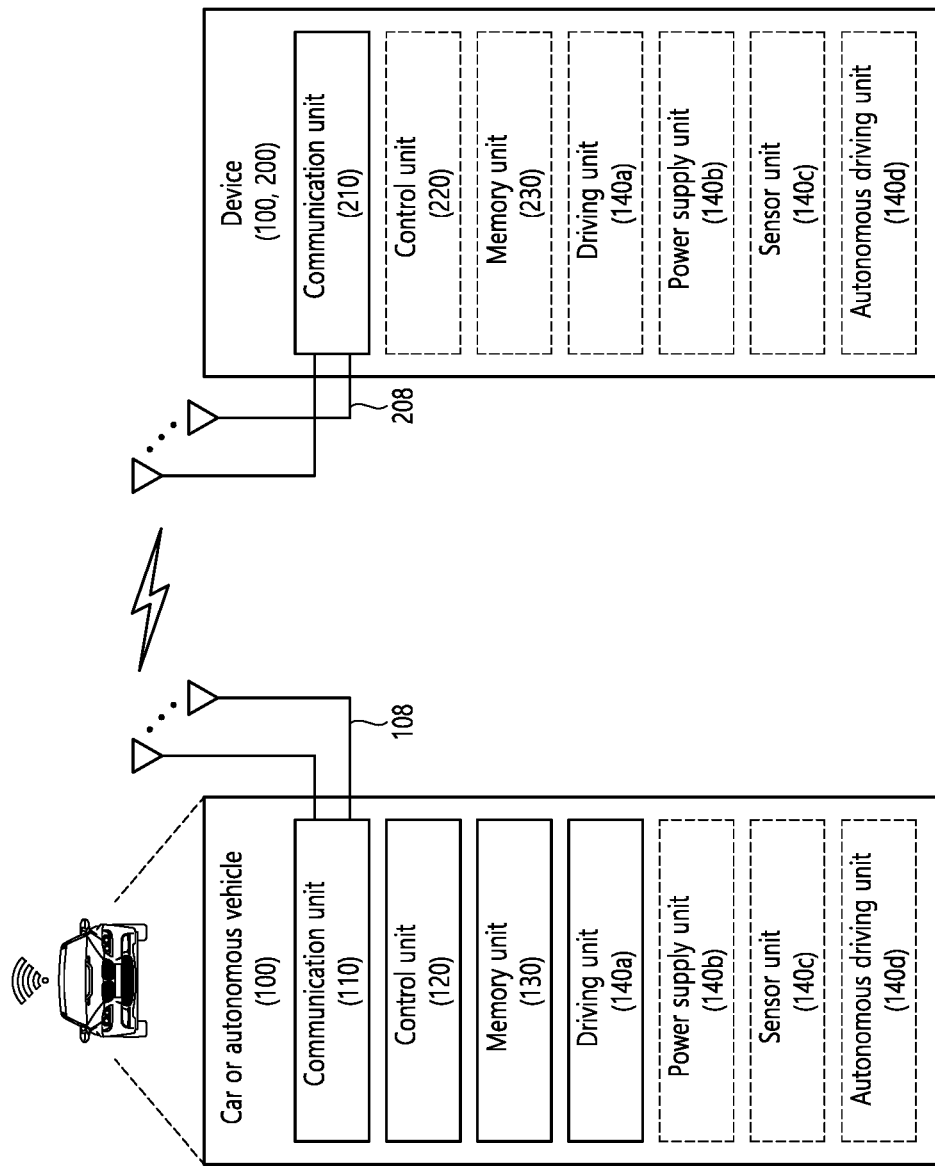
FIG. 17 illustrates an example of a vehicle or an autonomous vehicle that can be applied to the present specification.

FIG. 17 Illustrates an Example of a Vehicle or an Autonomous Vehicle that can be Applied to the Present Specification.

The vehicle or autonomous vehicle may be implemented as a mobile robot, a vehicle, a train, an aerial vehicle (AV), a ship, or the like.

Referring to FIG. 17, the vehicle or the autonomous vehicle 100 may include an antenna unit 108, a communication unit 110, a control unit 120, a driving unit 140a, a power supply unit 140b, a sensor unit 140c, and autonomous driving unit 140d.

The antenna unit 108 may be configured as part of the communication unit 110. The blocks 110/130/140a to 140d may correspond to blocks 110/130/140 of FIG. 15, respectively. The communication unit 110 may transmit or receive signals (e.g., data, control signals, etc.) with external devices, such as base stations (e.g. base stations, road side units, etc.), servers, and the like.

The control unit 120 may control various elements of the vehicle or the autonomous vehicle 100 to perform various operations. The control unit 120 may include an ECU (Electronic Control Unit). The driving unit 140a may cause the vehicle or the autonomous vehicle 100 to drive on the ground. The driving unit 140a may include an engine, a motor, a power train, wheels, a brake, a steering device, and the like. The power supply unit 140b supplies power to the vehicle or the autonomous vehicle 100, and may include a wired/wireless charging circuit, a battery, and the like.

The sensor unit 140c may obtain vehicle status, surrounding environment information, user information, and the like. The sensor unit 140c includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140d may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140d may generate an autonomous driving route and a driving plan based on the obtained data. The control unit 120 may control the driving unit 140a to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles.

In addition, during autonomous driving, the sensor unit 140c may acquire vehicle state and surrounding environment information. The autonomous driving unit 140d may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

Figure 18:
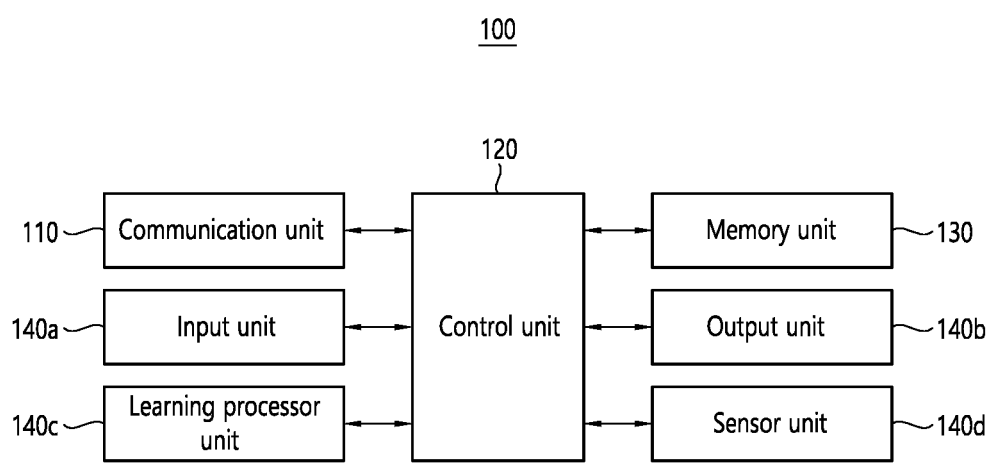
FIG. 18 illustrates an example of an AI device that can be applied to the present specification.

FIG. 18 Illustrates an Example of an AI Device that can be Applied to the Present Specification.

An AI device may be implemented as a fixed device or a mobile device, such as TVs, projectors, smartphones, PCs, laptops, digital broadcasting terminals, tablet PCs, wearable devices, set-top boxes (STBs), radios, washing machines, refrigerators, digital signage, robots, vehicles, and the like.

Referring to FIG. 18, the AI device 100 includes a communication unit 110, a control unit 120, a memory unit 130, an input/output unit 140a/140b, a learning processor unit 140c, and a sensor unit 140d. Blocks 110 to 130/140a to 140d respectively correspond to blocks 110 to 130/140 of FIG. 15.

The communication unit 110 communicates may transmit or receive wired signals and wireless signals (e.g., sensor information, user input, learning model, control signal, etc.) with external devices such as another AI device (e.g., FIG. 1, 100x, 200, 400) or an AI server (e.g., 400 of FIG. 12) by using a wired or wireless communication technology. To this end, the communication unit 110 may transmit information in the memory unit 130 to an external device, or may transmit a signal received from the external device to the memory unit 130.

The control unit 120 may determine at least one executable operation of the AI device 100 based on the information determined or generated using the data analysis algorithm or the machine learning algorithm.

In addition, the control unit 120 may control the components of the AI device 100 to perform the determined operation. For example, the control unit 120 may request, search, receive, or utilize data of the running processor 140c or the memory 130. The control unit 120 may control the components of the AI device 100 to execute a predicted or desirable operation among at least one executable operation.

In addition, the control unit 120 collects history information including the operation contents of the AI device 100 or the user's feedback on the operation, and stores the information in the memory unit 130 or the running processor unit 140c or transmits the information to an external device such as an AI server(FIG. 12, 400). The collected historical information can be used to update the learning model.

The memory unit 130 may store data supporting various functions of the AI device 100. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary for operation/execution of the control unit 120.

The input unit 140a may obtain various types of data from the outside of the AI device 100. For example, the input unit 140a may acquire training data for model learning, input data to which the training model is applied, and the like. The input unit 140a may include a camera, a microphone, and/or a user input unit. The output unit 140b may generate an output related to sight, hearing, or touch. The output unit 140b may include a display unit, a speaker, and/or a haptic module. The sensing unit 140 may obtain at least one of internal information of the AI device 100, environment information of the AI device 100, and user information using various sensors. The sensing unit 140 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar, and the like.

The learning processor unit 140c may train a model composed of artificial neural networks using the training data. The learning processor unit 140c may perform AI processing together with the learning processor unit of the AI server (FIGS. 12 and 400). The learning processor unit 140c may process information received from an external device through the communication unit 110 and/or information stored in the memory unit 130. In addition, the output value of the learning processor unit 140c may be transmitted to the external device through the communication unit 110 and/or stored in the memory unit 130. As described above, although the embodiments have been described as examples, since the content and scope of this specification will not be limited only to a particular embodiment of this specification, this specification may be amended, modified, or enhanced to other various forms.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing communication related to inter-band carrier aggregation (CA), the method performed by a wireless communication device and comprising:

transmitting capability information about a beam management type for the inter-band CA of a wireless communication device; and performing communication with the wireless communication device with both of a Primary Cell (PCell) and a Secondary Cell (SCell), wherein the SCell and the PCell use different operating bands for the inter-band CA, wherein the communication with both of the PCell and SCell is performed based on a relative receive timing difference between a first receive timing from the PCell and a second receive timing from the SCell, wherein the relative receive timing difference does not exceed a maximum receive timing difference (MRTD), wherein the MRTD is set based on a combination of frequency range for the PCell and frequency range for the SCell, and wherein the MRTD is applied based on that the beam management type for the inter-band CA is independent beam management, for a combination that frequency range for both of the PCell and SCell is frequency range 2 (FR2).

2. The method of claim 1,
wherein the beam management type for the inter-band CA is independent beam management or a common beam management.

3. The method of claim 1,
wherein the MRTD is 8 us, for the combination that frequency range for both of the PCell and SCell is FR2,
wherein the MRTD is 33 us, for a combination that frequency range for both of the PCell and SCell is FR1, and
wherein the MRTD is 25 us, for a combination that frequency ranges for the PCell and SCell are FR1 and FR2.

4. The method of claim 1,
wherein the communication with the both of the PCell and SCell is performed based on a relative transmission timing difference between a first transmission timing to the PCell and a second transmission timing to the SCell, and
wherein the relative transmission timing difference does not exceed a maximum transmission timing difference (MTTD).

5. The method of claim 4,
wherein the MTTD is applied based on that the beam management type for the inter-band CA is independent beam management, for the combination that frequency range for both of the PCell and SCell is FR2.

6. The method of claim 5,
wherein the MTTD is 8.5 us, for the combination that frequency range for both of the PCell and SCell is FR2,
wherein the MTTD is 34.6 us, for a combination that frequency range for both of the PCell and SCell is FR1, and
wherein the MTTD is 26.1 us, for a combination that frequency ranges for the PCell and SCell are FR1 and FR2.

7. A wireless communication device in wireless communication system, the wireless communication device comprising:
at least one transceiver;
at least one processor; and
at least one computer memory operably connectable to the at least one processor and storing instructions that, based on being executed by the at least one processor, perform operations comprising:

transmitting capability information about a beam management type for the inter-band CA of a wireless communication device; and performing communication with the wireless communication device with both of a Primary Cell (PCell) and a Secondary Cell (SCell), wherein the SCell and the PCell use different operating bands for the inter-band CA, wherein the communication with both of the PCell and SCell is performed based on a relative receive timing difference between a first receive timing from the PCell and a second receive timing from the SCell, wherein the relative receive timing difference does not exceed a maximum receive timing difference (MRTD), wherein the MRTD is set based on a combination of frequency range for the PCell and frequency range for the SCell, and wherein the MRTD is applied based on that the beam management type for the inter-band CA is independent beam management, for a combination that frequency range for both of the PCell and SCell is frequency range 2 (FR2).

8. The wireless communication of claim 7,
wherein the beam management type for the inter-band CA is independent beam management or a common beam management.

9. The wireless communication of claim 7,
wherein the MRTD is 8 us, for the combination that frequency range for both of the PCell and SCell is FR2,
wherein the MRTD is 33 us, for a combination that frequency range for both of the PCell and SCell is FR1, and
wherein the MRTD is 25 us, for a combination that frequency ranges for the PCell and SCell are FR1 and FR2.

10. The wireless communication of claim 7,
wherein the communication with the both of the PCell and SCell is performed based on a relative transmission timing difference between a first transmission timing to the PCell and a second transmission timing to the SCell, and
wherein the relative transmission timing difference does not exceed a maximum transmission timing difference (MTTD).

11. The wireless communication of claim 10,
wherein the MTTD is applied based on that the beam management type for the inter-band CA is independent beam management, for the combination that frequency range for both of the PCell and SCell is FR2.

12. The wireless communication of claim 11,
wherein the MTTD is 8.5 us, for the combination that frequency range for both of the PCell and SCell is FR2,
wherein the MTTD is 34.6 us, for a combination that frequency range for both of the PCell and SCell is FR1, and
wherein the MTTD is 26.1 us, for a combination that frequency ranges for the PCell and SCell are FR1 and FR2.

13. The wireless communication of claim 7, wherein the wireless communication device is an autonomous driving device, which communicates with at least one of a mobile terminal, a network, and an autonomous vehicle other than the wireless communication device.

* * * * *